US011982053B2

(12) United States Patent
Gingras et al.

(10) Patent No.: US 11,982,053 B2
(45) Date of Patent: May 14, 2024

(54) REFINER PLATE HAVING INTER-BAR WEAR PROTRUSIONS

(71) Applicant: ANDRITZ INC., Alpharetta, GA (US)

(72) Inventors: Luc Gingras, Yorkshire (GB); Tobias Michel, Werbachhausen (DE)

(73) Assignee: ANDRITZ INC., Alpharetta, GA (US)

( * ) Notice: Subject to any disclaimer, the term of this patent is extended or adjusted under 35 U.S.C. 154(b) by 436 days.

(21) Appl. No.: 17/277,205

(22) PCT Filed: Oct. 7, 2019

(86) PCT No.: PCT/US2019/054999
§ 371 (c)(1),
(2) Date: Mar. 17, 2021

(87) PCT Pub. No.: WO2020/076700
PCT Pub. Date: Apr. 16, 2020

(65) Prior Publication Data
US 2022/0034035 A1 Feb. 3, 2022

Related U.S. Application Data

(60) Provisional application No. 62/744,391, filed on Oct. 11, 2018.

(51) Int. Cl.
*D21D 1/30* (2006.01)
*B02C 7/06* (2006.01)
*B02C 7/12* (2006.01)

(52) U.S. Cl.
CPC ............... *D21D 1/306* (2013.01); *B02C 7/12* (2013.01); *B02C 7/06* (2013.01)

(58) Field of Classification Search
CPC .......... D21D 1/306; D21D 1/008; D21D 1/20; D21D 1/30; D21D 1/303; B02C 7/12; B02C 7/06; B02C 7/11
See application file for complete search history.

(56) References Cited

U.S. PATENT DOCUMENTS 3,473,745 A 10/1969 Shook, Jr. et al.
5,178,339 A 1/1993 Pilao
(Continued)

FOREIGN PATENT DOCUMENTS

CN 107519989 12/2017
CO 92288276 6/1988
(Continued)

OTHER PUBLICATIONS

Chile Application No. 00886-2021, Notice of Decision to Grant dated Nov. 28, 2022, 1 page.
(Continued)

*Primary Examiner* — Jacob T Minskey
*Assistant Examiner* — Matthew M Eslami
(74) *Attorney, Agent, or Firm* — Kilpatrick Townsend & Stockton LLP

(57) ABSTRACT

The problem of increased energy usage in refiners over the working life of a refining assembly is mitigated by the use of a refiner plate segment having a refiner side and a back side distally disposed from the refiner side, refiner bars engaged to a substrate of the refiner side, wherein the refiner bars have a refiner bar height, and wherein adjacent refiner bars and the substrate define grooves between the adjacent bars, and protrusions disposed in the grooves, wherein the protrusions have a protrusion height, wherein the protrusion height is 30% or less of the refiner bar height.

23 Claims, 12 Drawing Sheets

(56) References Cited

U.S. PATENT DOCUMENTS

| | | | | |
|---|---|---|---|---|
| 5,492,548 | A * | 2/1996 | Wasikowski | B24D 3/28 51/293 |
| 6,032,882 | A | 3/2000 | Farahmand et al. | |
| 6,032,888 | A * | 3/2000 | Deuchars | B02C 7/12 241/261.3 |
| 6,607,153 | B1 | 8/2003 | Gingras | |
| 2002/0185560 | A1 | 12/2002 | Johansson | |
| 2014/0077016 | A1 | 3/2014 | Gingras | |
| 2017/0362773 | A1* | 12/2017 | Lindblom | D21C 3/222 |

FOREIGN PATENT DOCUMENTS

| | | | | |
|---|---|---|---|---|
| JP | 06101188 A | 4/1994 | | |
| JP | 2014118668 A | 6/2014 | | |
| RU | 2471618 | 1/2013 | | |
| WO | 9833594 | 8/1998 | | |
| WO | WO-9833594 A1 * | 8/1998 | | B02C 7/12 |
| WO | 0010710 A1 | 3/2000 | | |

OTHER PUBLICATIONS

International Application No. PCT/US2019/054999, International Preliminary Report on Patentability dated Apr. 22, 2021, 10 pages.
Indian Application No. 202147015973, First Examination Report dated Jul. 13, 2022, 9 pages.
Chinese Application No. 201980066833.9, Office Action, dated Jun. 15, 2022, 13 pages (4 pages English translation and 9 pages of original document).
Russian Application No. 2021109783, Decision to Grant, dated Jun. 10, 2022, 23 pages (8 pages English translation and 15 pages of original document).
European Application No. 19872072.4, Extended European Search Report dated Jun. 8, 2022, 6 pages.
Columbian Application No. NC2021/0005516, Office Action dated Nov. 30, 2022 (16 total pages, 7 pages of English summary, 9 pages of original document).
Russian Application No. 2021109783, Office Action dated Dec. 28, 2021, 17 pages (10 pages of Original Document and 7 pages of English Translation).
Chile Application No. 00886-2021, Office Action dated Sep. 2, 2022, 23 pages (21 pages original document, 2 pages English summary).
Chile Application No. 00886-2021, Office Action dated Mar. 18, 2022, 19 pages.
Indonesian Application No. P00202102477, Office Action, dated May 24, 2023, 5 pages (3 pages of Original Document and 2 pages of English Translation).
Singapore Application No. 11202103297P, Written Opinion dated Dec. 6, 2021, 13 pages.
Colombia Application No. NC20210005516, Office Action dated Jun. 22, 2023, 15 pages (10 pages original document and 5 pages English summary).
Japanese Application No. 2021-519829, Office Action dated Jun. 21, 2023, 9 pages (4 pages of original document and 5 pages of English translation).
International Application No. PCT/US2019/054999, International Search Report and Written Opinion dated Dec. 4, 2019, 12 pages.
Chinese Application No. 201980066833.9, Notice of Decision to Grant dated Dec. 16, 2022, 4 pages.
Ukraine Application No. UAa202101865, Office Action dated Sep. 19, 2023, 16 pages.
Brazil Application No. 112021006360-9, Office Action, dated Nov. 21, 2023, 6 pages (1 page of English translation and 5 pages of original document).
Colombian Application No. NC2021/0005516, Office Action mailed on Oct. 31, 2023, 14 pages (8 pages of original document and 6 pages of English translation).
Japanese Application No. 2021-519829, Notice of Decision to Grant mailed on Dec. 27, 2023, 6 pages (3 pages of original document and 3 pages of English translation).
Vietnamese Application No. 1-2021-02453, Office Action mailed on Nov. 22, 2023, 3 pages (2 pages of original document and 1 page of English translation).
Canadian Application No. 3114202, Office Action mailed on Jan. 19, 2024, 4 pages.
UAA202101865, Office Action, Mar. 7, 2024, 4 pages (2 pages original document, 2 pages English translation).

* cited by examiner 100
135
121
124
113
105
A
108
110
127
123
123z
123zz
169
T
C
116
120
150
124
107
140
125
130
112
R
115
145
125z
125zz
W 1150
1130x
1196
1137
1194
1125x
1170
1160
1185
1128
1125
1130
1120
1100

REFINER PLATE HAVING INTER-BAR WEAR PROTRUSIONS

CROSS-RELATED APPLICATION

This application claims the benefit under 35 U.S.C. § 119 (e) of the earlier filing date of U.S. Provisional Patent Application No. 62/744,391 filed on Oct. 11, 2018, the entirety of which is incorporated herein by reference.

BACKGROUND OF THE INVENTION

1. Technical Field

The present disclosure relates generally to refiner plates configured to grind fibrous material and more particularly to refiner plate segments configured to grind wood chips or other lignocellulosic material.

2. Related Art

Processed cellulosic material can be a primary component in several fiber-based products, including for example, pulps, papers, medium density fiberboard ("MDF"), fibrous packaging materials, and liquid-absorbent filler materials. To produce these products commercially, operators often start with lignocellulosic material as a raw material. Lignocellulosic material is generally plant-based matter that comprises celluloses and hemicelluloses chemically bonded to the protein lignin. Examples of lignocellulosic plant matter include wood chips, corn stover, sugar cane bagasse, and recycled paper.

To produce MDF for example, operators may feed lignocellulosic material (commonly in the form of wood chips, wood waste products, sawdust, wood shavings, discarded construction material, or agricultural waste products) through a mechanical refiner.

A mechanical refiner typically comprises two or more opposing refiner assemblies. Each assembly has a pattern of raised refiner bars on a refiner side. Grooves separate adjacent refiner bars. Typically, these refining assemblies are either circular discs, annular discs, nested conical frustums, or nested cylinders configured to rotate around a common axis. Each refiner assembly may comprise several annular sector-shaped segments secured to a backing structure to form the circular disc, annular disc, conical frustum, or cylinder. The refiner sides of the opposing refining assemblies face each other and a narrow refining gap separates the opposing refining assemblies. At least one of the refining assemblies is a rotor configured to rotate around the axis. As the rotor refining assembly rotates at high speeds, operators feed lignocellulosic material or other feed material through the refining gap to separate, develop, and cut the component fibers. As the mechanical refiner breaks down lignocellulosic material, some water may be released in the form of steam.

The inlet of the refining gap is disposed nearer to the center of rotation than the outlet to the refining gap. As the rotor refining assembly rotates, the feed material passes radially outward through the refining gap.

SUMMARY OF THE INVENTION

The problem of increased energy usage in mechanical refiners over the working life of a mechanical refiner is mitigated by the use of an exemplary refiner plate segment having a refiner side and a back side distally disposed from the refiner side, refiner bars engaged to a substrate of the refiner side, wherein the refiner bars have a refiner bar height, and wherein adjacent refiner bars and the substrate define grooves between the adjacent bars, and protrusions disposed in the grooves, wherein the protrusions have a protrusion height, wherein the protrusion height is 25% or less of the refiner bar height and wherein the protrusions are configured to wear over time.

A problem with low-consistency refining is that new refiner plate segments can have excessive flow capacity due in part to the initial volume of the grooves. This is particularly true with tall refiner bars, which in turn create grooves of greater volume. Refiner plate segments with greater flow capacity allow more dilute feed material to pass through the refining section over a given amount of time. If the flow capacity exceeds the refining capacity, the refiner will generate more pumping and the energy required to rotate the refiner will be higher, thereby resulting in energy losses that are greater than usual. The process may create a high-pressure outlet flow, which can cause further trouble downstream.

BRIEF DESCRIPTION OF THE DRAWINGS

The foregoing will be apparent from the following more particular description of exemplary embodiments of the disclosure, as illustrated in the accompanying drawings in which like reference characters refer to the same parts throughout the different views. The drawings are not necessarily to scale, with emphasis instead being placed upon illustrating the disclosed embodiments.

FIG. 7 highlights refiner plate segments relative to the overall mechanical refiner.

DETAILED DESCRIPTION OF THE INVENTION

Figure 1:
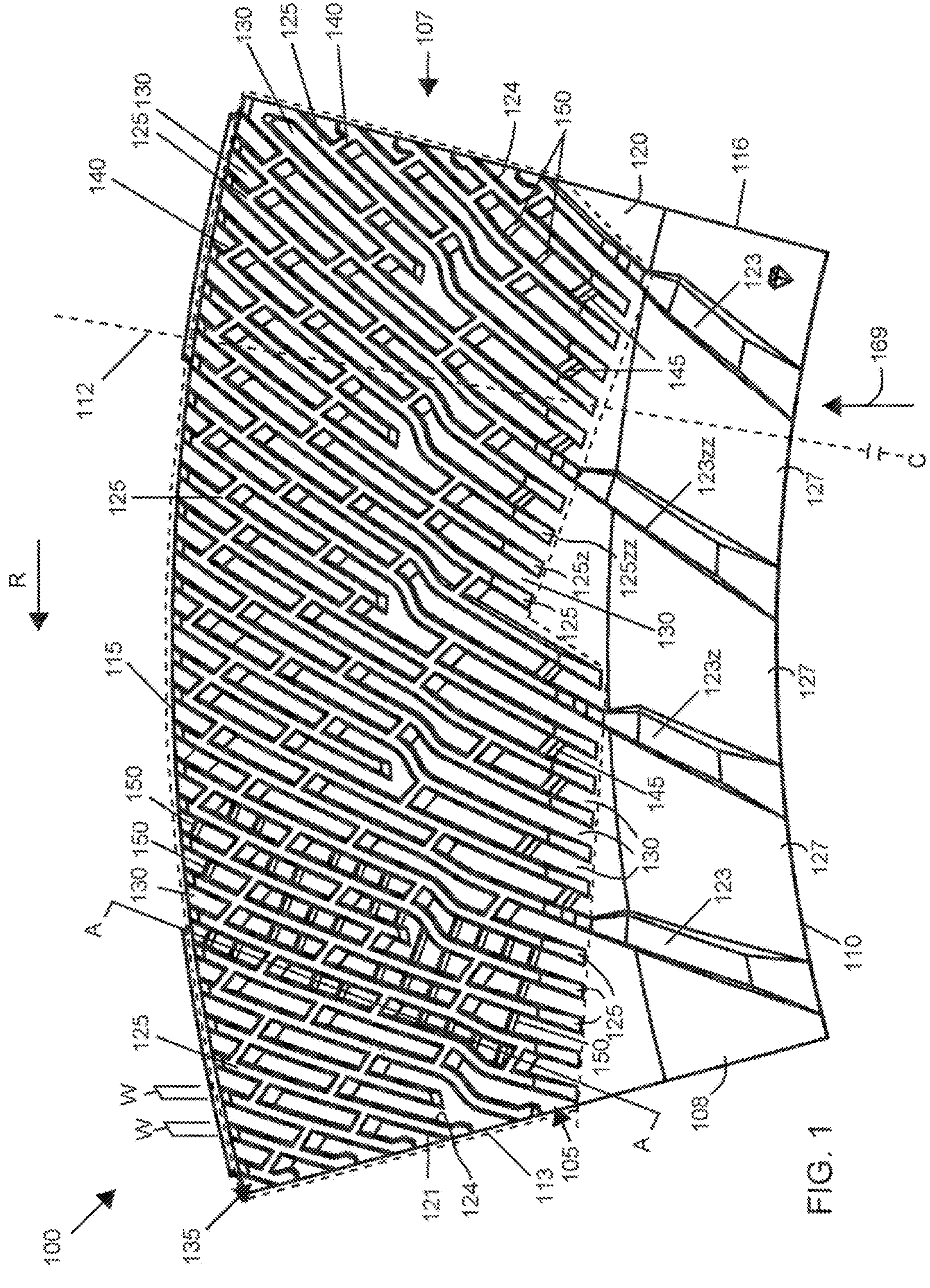
FIG. 1 is a front view of the refiner side of an exemplary refiner plate segment having a series of protrusions disposed between adjacent refiner bars.

The following detailed description of the preferred embodiments is presented only for illustrative and descriptive purposes and is not intended to be exhaustive or to limit the scope and spirit of the invention. The embodiments were selected and described to best explain the principles of the invention and its practical application. One of ordinary skill in the art will recognize that many variations can be made to the invention disclosed in this specification without departing from the scope and spirit of the invention.

Corresponding reference characters indicate corresponding parts throughout the several views. Although the drawings represent embodiments of various features and components according to the present disclosure, the drawings are not necessarily to scale and certain features may be exaggerated in order to better illustrate embodiments of the present disclosure, and such exemplifications are not to be construed as limiting the scope of the present disclosure in any manner.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Although specific terms are used in the following description for the sake of clarity, these terms are intended to refer only to the particular structure of the embodiment selected for illustration in the drawings, and are not intended to define or limit the scope of the disclosure.

The singular forms "a," "an," and "the" include plural referents unless the context clearly dictates otherwise. Numerical values should be understood to include numerical values, which are the same when, reduced to the same number of significant figures and numerical values which differ from the states value by less than the experimental error of conventional measurement technique of the type described in the present application to determine the value.

To the extent necessary to provide descriptive support, the subject matter and/or text of the appended claims is incorporated herein by reference in their entirety.

Recitation of ranges of values herein are merely intended to serve as a shorthand method of referring individually to each separate value falling within the range of within any sub ranges there between, unless otherwise clearly indicated herein. Each separate value within a recited range is incorporated into the specification or claims as if each separate value were individually recited herein. Where a specific range of values is provided, it is understood that each intervening value, to the tenth or less of the unit of the lower limit between the upper and lower limit of that range and any other stated or intervening value in that stated range or sub range hereof, is included herein unless the context clearly dictates otherwise. All subranges are also included. The upper and lower limits of these smaller ranges are also included therein, subject to any specifically and expressly excluded limit in the stated range.

As used herein, approximating language may be applied to modify any quantitative representation that may vary without resulting in a change in the basic function to which it is related. Accordingly, a value modified by a term or terms, such as "about" and "substantially," may not be limited to the precise values specified. The modifier "about" should also be considered as disclosing the range defined by the absolute values of the two endpoints. For example, the expression "from about 2 to about 4" also discloses the range "from 2 to 4."

It should be noted that many of the terms used herein are relative terms. For example, the terms "upper" and "lower" are relative to each other in location, i.e. an upper component is located at a higher elevation than a lower component in a given orientation, but these terms can change if the device is flipped. The terms "inlet" and "outlet" are relative to a fluid flowing through them with respect to a given structure, e.g. a fluid flows through the inlet into the structure and flows through the outlet out of the structure. The terms "upstream" and "downstream" are relative to the direction in which a fluid flows through various components, i.e. the flow of fluids through an upstream component prior to flowing through the downstream component.

The terms "horizontal" and "vertical" are used to indicate direction relative to an absolute reference, i.e. ground level. However, these terms should not be construed to require structure to be absolutely parallel or absolutely perpendicular to each other. For example, a first vertical structure and a second vertical structure are not necessarily parallel to each other.

The terms "top" and "bottom" or "base" are used to refer to locations/surfaces where the top is always higher than the bottom/base relative to an absolute reference, i.e. the surface of the Earth. The terms "upwards" and "downwards" are also relative to an absolute reference; an upwards flow is always against the gravity of the Earth.

The term "directly," wherein used to refer to two system components, such as valves or pumps, or other control devices, or sensors (e.g. temperature or pressure), may be located in the path between the two named components.

Figure 7:
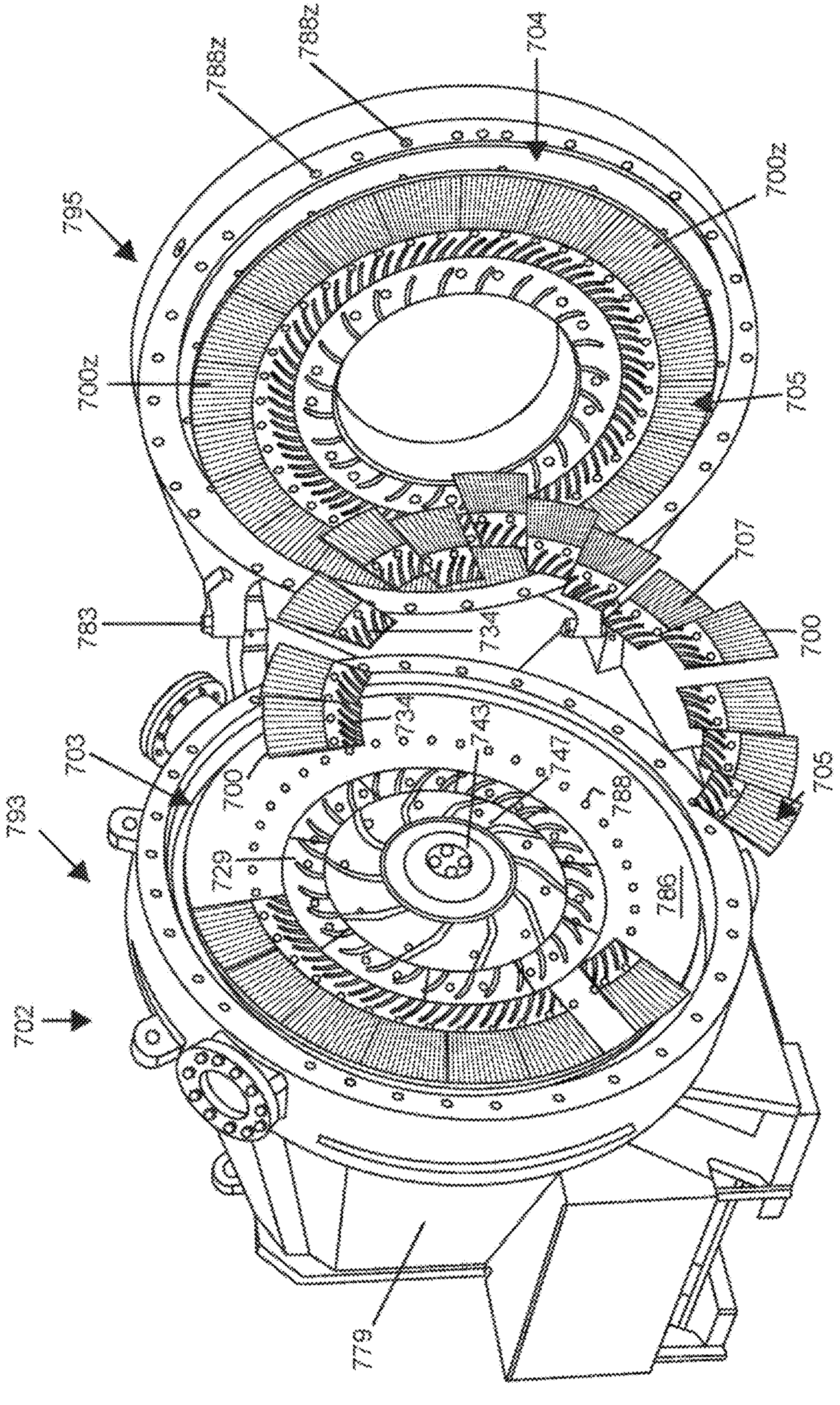
FIG. 7 is a schematic representation of a perspective view of a mechanical refiner in an open position.

FIG. 7 depicts an example mechanical disc refiner 702 in an open position. The rotor assembly 703 and stator assembly 704 sit within a housing 779. Each refining assembly 703, 704 comprises a plurality of refiner plate segments 700 annularly arrayed to form a ring mounted on the backing structure 786. To better illustrate the refiner plate segments 700 on the rotor assembly 703, FIG. 7 shows a partially exploded view wherein some of the refiner plate segments

700 are aligned with, but are removed from fastening holes 788 on the backing structure 786. FIG. 7 shows the stator side 795 of the housing 779 open around hinges 783 to better depict the respective refining assemblies 703, 704. However, during operation, the stator assembly 704 is closed around the hinges 783 and bolts (not depicted) extend through the respective fastener holes 788*z* to fixedly engage the stator side 795 of the housing 779 to the rotor side 793. In this respect, the rotor assembly 703 can be said to be oppositely disposed from a stator assembly 704. When the stator assembly 704 and rotor assembly 703 face each other, the stator assembly 704 and the rotor assembly 703 define a gap 619 (FIG. 6) between the refiner sides 705 of the opposing refiner plate segments 700, 700*z*. It will be understood that other mechanical refiners have different opening mechanisms (i.e. not necessarily a hinge 783).

For large diameter mechanical disc refiners 702, one or more rings of intermediate refiner plate segments can be disposed between a breaker bar segment 729 and an outer refiner plate segment 700. However, it will also be understood that such intermediate rings are rare. Bolts or fasteners can extend through fastener holes 788 to engage the refiner plate segments 700, 729 to the backing structure 786 and thereby fixedly engage the annular sector-shaped refiner plate segments 700, 729 to the backing structure 786. It will be understood that other known ways to affix refiner plate segments to a backing structure are considered to be within the scope of this disclosure and within the scope of the term, "fixedly engage."

As used herein and unless otherwise specified, "refiner plate segment" 700, 729 can refer to a refiner plate segment 700 having an integrated refining section 707 and breaker bar section 734, breaker bar segments 729 (see FIG. 3A), and a refiner plate segment comprising a refining section 707 but lacking a breaker bar section 734. In embodiments having outer refiner plate segments 700 and breaker bar segments 729, the outer refiner plate segments 700 can still comprise an integrated refining section 707 and breaker bar section 734. However, the breaker bars 725 on an outer refiner plate segment 700 are generally smaller than the breaker bars 725 on a breaker bar segment 729. When mounted on a backing assembly 786, the breaker bar segments 729 are disposed radially inward from the outer refiner plate segments 700. In FIG. 7, the breaker bar segments 729 are disposed around an annular flinger 747. The annular flinger is in turn disposed around a hub 743.

Figure 6:
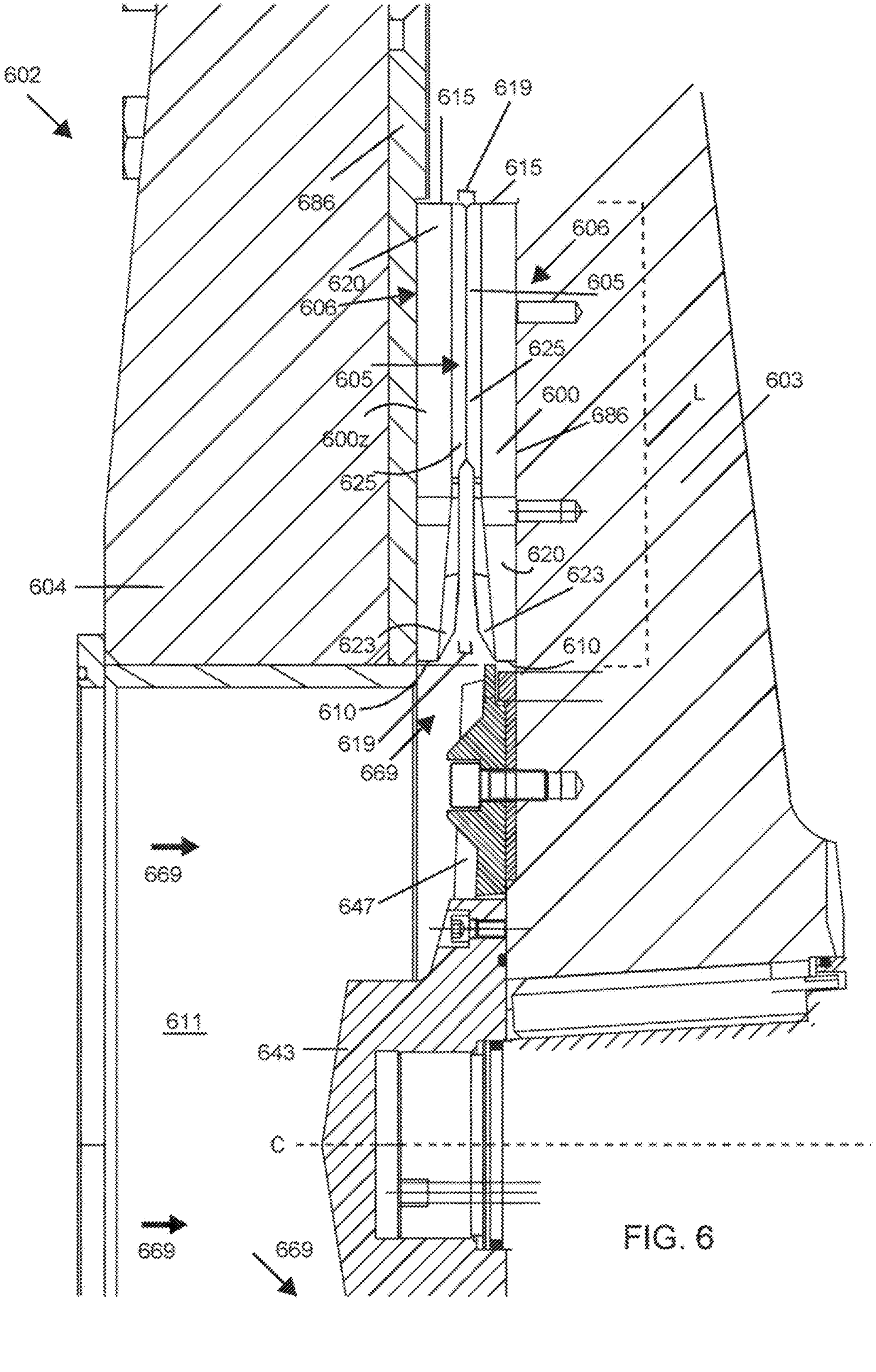
FIG. 6 is a cross-sectional schematic representation of a side view of a mechanical refiner showing opposing refiner plate segments defining a gap.

Although FIGS. 7 and 6 depict a disc mechanical refiner 702, 602 to illustrate the general concept of refining, conical refiners and cylindrical refiners are also common types of mechanical refiners and it will be understood that exemplary refiner plate segments disclosed herein that are configured to work with conical and cylindrical types of mechanical refiners are within the scope of this disclosure. Whereas a disc refiner has two or more opposing discs as depicted in FIGS. 7 and 6, a conical refiner has two or more nested truncated conical frustums disposed around a common axis, wherein at least one of the nested truncated conical frustum comprises a rotor assembly. Likewise, a conical refiner has two or more nested cylindrical refining assemblies disposed around a common axis, wherein at least one of the cylindrical refining assembly is a rotor.

Cylindrical and conical mechanical refiners can have a rotor assembly (see 703, 603) and a stator assembly (704, 604). Other disc, conical, twin flow, and cylindrical refiners can have counter-rotating refining assemblies, or multiple rotor assemblies facing (or nested in) opposing stator assemblies. It will be appreciated that refiner plate segments configured for a conical refiner or a cylindrical refiner are adapted to form a truncated conical frustum or a cylinder when fully assembled on the corresponding refining assembly.

FIG. 6 is a cross-sectional view of a mechanical refiner 602 similar to the mechanical refiner depicted in FIG. 7. This particular mechanical refiner 602 has a rotor assembly 603 facing an oppositely disposed stator assembly 604. Bolts fasten refiner plate segments 600, 600*z* to the rotor 603 and the stator 604 respectively. The refiner sides 105 (FIG. 1) of the opposing refiner plate segments 600, 600*z* face each other to define a gap 619. Feed material 669 enters the mechanical refiner 602 through an inlet 611. As the rotor assembly 603 spins around the center axis of rotation C, the hub 643 and the flinger 647 direct the feed material 669 into the gap 619 between the refiner sides 605 of opposing refiner plate segments 600, 600*z*. Breaker bars 623 in a breaker bar section 108 (FIG. 1) break the feed material 669 into smaller pieces before feeding the feed material 669 into the refining section 107 (FIG. 1) comprising refiner bars 625 and grooves 130 (FIG. 1). The depicted embodiment shows the inner arc 610 of the refiner plate segments 600. The outer arc 615 is distally disposed from the inner arc 610 along a substrate 620. The backside 606 of each refiner plate segment 600, 600*z* engages the backing structure 686 of the respective refining assembly 603, 604.

Although FIG. 6 depicts a rotor-stator mechanical refiner 602, nothing in this disclosure should be construed to limit exemplary refiner plate segments 600 having exemplary protrusions 150 for use in a particular type of mechanical refiner 602. It is understood that refiner plate segments 100 having exemplary protrusions 150 as described herein can be used in disc refiners, conical refiners, twin flow refiners, refiners having a stator and a rotor, counter rotating refiners, refiners having multiple opposing discs or cones, and any other mechanical refiner.

In a typical mechanical refiner, as at least one of the rotor assemblies 703, 603 rotates, one edge of each refiner bar 125 (FIG. 1) tends to encounter the feed material 669 (FIG. 6) before the coplanar transverse distal edge of each respective refiner bar 125. The edge that tends to encounter the feed material first is known as the "leading edge" 135 (FIG. 1). The designation of the leading edge 135 depends on the direction of rotation. For example, when the direction of rotation is reversed, the previously designated distal edge becomes the leading edge 135.

A typical rotor assembly 703, 603 spins in a range of 900 to 2,300 rotations per minute ("rpm") for high consistency refining and for MDF production and is configured to transfer significant kinetic energy to the feed material 669 as the feed material 669 moves through the refining gap 619. In low-consistency refining, the rotor may rotate at speeds of 400 to 1500 rpm. As a rotor refiner assembly 603 rotates, the leading edges 135 of the refiner bars 625 on the opposing refiner assemblies 603, 604 successively overlap and entrap feed material 669 between the opposing refiner bars 625, 625*z*. As the rotor refiner assembly continues to rotate, the opposing bars shear the feed material 669 to develop, separate, and cut the fibers. That is, the successively overlapping bars 625, 625*z* compress the feed material 669, thereby transferring more energy to the feed material 669 and performing more work on the feed material 669.

As the rotor refiner assembly 603 continues to rotate, the opposing bars 625, 625*z* will pass each other and adjacent opposing grooves (see 130, FIG. 1 and FIG. 6) on opposite refiner assemblies 603, 604 successively align. This expansion stage successively follows the compression stage and allows the feed material 669 to move radially outward toward the outlet of the refining gap 619 more freely than during the compression stage.

The accumulation of feed material 669 in the refining gap 619 and in the grooves 130 creates a fiber pad. Successive instances of compression and expansion in the fiber pad are believed to be the primary location where mechanical refining occurs. That is, forceful movement of feed material 669 against adjacent feed material 669 in the fiber pad contributes primarily to fiber development, separation, and cutting.

Over time, contaminants that may be present in the feed material 669 wear down the refiner bars 625, 125. Because the space between adjacent bars 125, 125*z* (FIG. 1)) defines the grooves 130, the grooves 130 become shallower when the heights of the adjacent bars 125, 125*z* decrease. Shallower grooves allow more feed material 669 to accumulate in the refining gap 619, thereby creating a thicker, denser fiber pad. That is, shallow worn grooves have less volume than tall new grooves. Lignocellulosic feed material 669 that would have moved through the tall new grooves moves instead to the refining gap 619 when the grooves 130 become worn and shallow. The compression stage therefore transfers more kinetic energy to a greater amount of feed material 669 in the refining gap 619 and the additional feed material 669 allows for more fiber-to-fiber friction. The thicker fiber pad therefore absorbs more energy than a thinner fiber pad, with all other variables being equal.

The excess energy in the thicker fiber pad tends to over-refine the feed material 669 to create an excess of shives. "Shives" are thin slivers of refined material that are undesirable for use in the final product. As a result, as the refiner plate segments wear, the product quality degrades assuming that the energy input remains constant. Eventually, refiner bar wear becomes so severe that the refiner plates segments 600 will need to be replaced. This usually occurs when energy consumption per unit of acceptable fiber produced becomes unacceptably high, or when shive production becomes so pronounced that an acceptable final product can no longer be produced.

Too high a shive content in the final product would render the final product unsuitable for its intended purpose. For example, in MDF production, if there are too many shives in the medium density fiberboard, the board will likely not have the requisite properties (e.g. strength, durability, etc.). Therefore, as bars wear, the energy within the mechanical refiner increases without improving product quality. Stated another way: as the bars wear, operators expend more energy to produce inferior fiber, which leads to an inferior final product (e.g. MDF), which is often sold at lower prices. To address this problem, operators periodically deactivate the mechanical refiners 602, 702 to replace the refiner plate segments 600, 700 that comprise the refining assemblies 603, 703, 604, 704. This downtime contributes to further production loss.

Some manufacturers have tried to increase the refiner bar height to address this problem. Increasing the refiner bar height also increases the depth of the adjacent grooves. However, the taller refiner bars tend to result in poorer initial performance. Excessively tall bars in MDF and high-consistency refining (e.g. about 8 mm or taller) can lead to unstable operation, an increase in untreated material (and can create more shives), and can contribute toward difficulty in applying refining load because not enough of the feed material 669 is kept in the refining gap 619. These negative factors offset any potential gains in wear life. Furthermore, excessively tall refiner bars (relative to refiner bar widths) in MDF, high-consistency, and low-consistency refining can increase the risk of a refiner bar breaking during operation. Metal debris in a mechanical refiner can rapidly escalate refiner plate segment wear and degradation.

In the case of low-consistency refiners, tall bars create a high pumping effect and a high outlet pressure, which results in higher pumping energy and increased operating costs. As such, the cost (in terms of energy and capital) of running new low-consistency refiners with excessively tall refiner bars (e.g. about 8 mm or taller) exceeds the value that can be derived from feed material 669 that has been processed through such a low-consistency refiner. These costs offset any gains in refiner plate segment operating life. As the bars wear down, the pumping energy reaches cost-competitive values. When as bars' height becomes too low, the refiner will not be able to handle the flow and pumping requirements, which leads to further unprocessed feed material 669. As such, low-consistency refiners have a narrow range of bar heights at which efficient refining can occur. This negatively affects the useful lifetime of low-consistency refiner plate segments.

Exemplary embodiments in accordance with this disclosure permits a wider range of refiner bar heights (i.e. the refiner bars have more distance to wear) without incurring the additional problems of higher energy consumption and/or poor product quality. The problem of increased energy usage in mechanical refiners over the working life of a mechanical refiner is mitigated by the use of an exemplary refiner plate segment having a refiner side and a back side distally disposed from the refiner side, refiner bars engaged to a substrate of the refiner side, wherein the refiner bars have a refiner bar height, and wherein adjacent refiner bars and the substrate define grooves between the adjacent bars, and protrusions disposed in the grooves, wherein the protrusions have a protrusion height, wherein the protrusion height is 25% or less of the refiner bar height and wherein the protrusions are configured to wear over time.

FIG. 1 depicts the refiner side 105 of an exemplary refiner plate segment 100 having exemplary protrusions 150 disposed on a substrate 120 within grooves 130. The refiner plate segment 100 has a curved inner arc 110 disposed radially inward from a curved outer arc 115 as measured along a radial line 112 extending from the center of refiner plate rotation C when mounted in a mechanical refiner 602. The refiner plate segment 100 further comprises a first end 113 distally disposed from a second end 116. The first end 113 and second end 116 extend from the inner arc 110 to the outer arc 115 along a radial line (see 112). The substrate 120 extends among the inner arc 110, outer arc 115, first end 113, and second end 116.

The depicted refiner plate segment 100 is a refiner plate segment for a disc refiner. It will be understood that exemplary refiner plate segments can be used in all types of mechanical refiners, particularly in conical refiners and cylindrical refiners. Further, exemplary refiner plate segments as described more fully herein can be configured for all thermomechanical refining applications, including that of high-consistency refining, low-consistency refining, and in the production of medium density fiberboard. In operation, the first end 113 of the refiner plate segment 100 abuts the second end 116 of an adjacent refiner plate segment 100 (see FIG. 7) until the assembly of adjacent refiner plate segments 100 create an annular disc, whereby the aligned curved inner arcs 110 form the disc's inner circumference and the aligned curved outer arcs 115 form the disc's outer circumference. Each refiner plate segment 100 is fastened to a backing structure 738 on either the rotor 603 or stator 604.

Breaker bars 123 and refiner bars 125 engage a substrate 120 on the refiner side 105. Adjacent refiner bars (see for example 125*z* and 125*zz*) and the substrate 120 define grooves 130 between the adjacent refiner bars 125*z* and 125*zz* to thereby form a pattern of refiner bars 125 and grooves 130 throughout the refining section 107 (e.g. area of pattern of refining bars 125 and grooves 130 enclosed by dotted line in FIG. 1). Likewise, adjacent breaker bars (see for example 123*z* and 123*zz*) and the substrate 120 define breaker grooves 127 along the breaker bar section 108. The breaker bar section 108 is defined by the area of the refiner plate segment 100 occupied by the breaker grooves 127 and breaker bars 123, whereas the refining section 107 is defined by the area of the refiner plate segment 100 comprising a pattern of refiner bars 125 and grooves 130. The refining section 107 is disposed radially outward from the breaker bar section 108. In an exemplary embodiment, protrusions 150 are disposed in the breaker bar section 108 between adjacent breaker bars 123*z* and 123*zz*.

As feed material 169 approaches the refining gap 619 (FIG. 6), breaker bars 123 disposed at or near the annular or conical plate's inner arc 110 break the incoming feed material 169 into smaller pieces before the feed material 169 encounters the refining section 107. The fiber pad forms between refining sections 107 on opposing plates. Therefore, the refining section 107 and the fiber pad is the location in which the feed material 169 is exposed, developed and cut into fibers.

The pattern of refiner bars 125 and grooves 130 depicted in FIG. 1 is included for exemplary purposes. It will be understood that refiner plate segments 100 having different patterns or configurations of refiner bars 125 and grooves 130 are considered to be within the scope of this disclosure. Refiner plate segments 100 may have dams 140, 145 disposed between adjacent refiner bars 125. In the depicted embodiment, some of the dams are full-surface dams 140 that have the same height as the refiner bar height H (FIG. 2), while some other dams are subsurface dams 145. A subsurface dam height sh (FIG. 3) is generally 30%-90% of the refiner bar height H (i.e. the groove depth). In MDF and high-consistency applications for example, the subsurface dam height sh is usually between 30% and 50% of the refiner bar height H. Furthermore, designers typically incorporate subsurface dams 145 to reinforce the bars structurally.

Full-surface dams 140 block grooves 130 and are designed to direct feed material 169 into the refining gap 619. Dams 140, 145 are disposed infrequently in grooves 130 compared to protrusions 150. Some exemplary refiner plates have protrusions in combination with only surface dams, or protrusions in combination with only subsurface dams. Other exemplary refiner plate segments lack dams. Furthermore, a dam 140, 145 has a greater cross-sectional area than a protrusion 150 disposed in the same groove 130 (see FIG. 3). In an exemplary embodiment, a protrusion 150, 250 can be about 1 millimeter ("mm") long at the top 257 (FIG. 2), and no more than 3 mm long at the base 258 (FIG. 2), where the protrusion 150 joins the substrate 120 of the groove 130. In an exemplary embodiment, the refiner bars 125 can have an initial height of 12 mm and the protrusions can be 2 mm tall.

In other exemplary embodiments, the refiner bars 125 have an initial height of 12 mm-15 mm or any height in between and the protrusions have an initial height of 2 mm-3 mm and any height in between. In other exemplary embodiments, the refiner bars 125 are taller than 15 mm. In yet other exemplary embodiments, the protrusions can have greater heights when the height required for functional designs is low. In low consistency refiners for example, the refining bar height for pumping and flow purposes may be 4 mm-6 mm. In such low-consistency refiner plate segments, the initial refiner bar height is 12 mm-16 mm and the initial protrusion height is 4 mm-6 mm. Preferably, such an arrangement in a low consistency refiner plate segments have thin protrusions (relative to any comparable dams 140, 145), are made from softer material than the refiner bars 125, or are both thinner than dams 140, 145 and are made from softer material than the refiner bars 125

As a comparison, the subsurface dams 145 may be 1 mm-3 mm long at a subsurface dam top 387 (FIG. 3) and 6 mm-10 mm long at the subsurface dam base 398 (FIG. 3), where the subsurface dam 145 engages the substrate 120 of the grooves 130. Full-surface dams can be 1 mm-4 mm long at a full-surface dam top 397 (FIG. 3) and 6 mm-15 mm long at the full-surface dam base 338 (FIG. 3). The function of the subsurface dams 145 is to reinforce the refiner plate segment pattern of refiner bars 125 and grooves 130 against the risk of breakage, and to deflect the feed material 169 towards the refining gap 619 between rotor and stator. The function of the protrusions 150 by contrast, is to make a deep groove behave like a shallower groove, while allowing the said protrusions 150 to wear out with the refiner bars 125 and to therefore maintain a more constant effective groove depths 226 (FIG. 2) as the refiner bar tops 228 wear with usage.

FIG. 1 further depicts multiple protrusions 150 disposed within the grooves 130. The base 258 of each protrusion 150 engages the substrate 120. A first side 582 (FIG. 5) of a protrusion 150 engages a leading face 121 of an adjacent refiner bar 125*z* and a second side 581 (FIG. 5) of the protrusion 150 engages a trailing face 124 of the other adjacent refiner bar 125*zz*. The protrusions 150 are characterized by being thin (i.e. having a short protrusion length l, FIG. 2) relative to the refiner bar width W at the refiner bar base 359 (FIG. 3). The protrusions 250 are also characterized by being small in cross section (i.e. having a short protrusion height h (FIG. 2) and protrusion length l) relative to the reference dimensions of an adjacent refiner bar 125*z* (see FIG. 4 and FIG. 5 for more detail). The protrusions 150 have a protrusion height h that is no more than 25% of the refiner bar height H. In certain exemplary embodiments, the protrusion length l is no more than 10% of the refiner bar length L. In refining applications, including low-consistency, high-consistency, and MDF applications for example, the protrusion height h is preferably less than 30% of the refiner bar height H. In other exemplary embodiments, the protrusion height h is preferably less than 25% of the refiner bar height H. The protrusion height h is about 20% of the refiner bar height H in other exemplary embodiments. Multiple protrusions 150 can be disposed in a groove 130. In other exemplary embodiments, a refiner plate segment 100 can have at least one protrusion 150 disposed within a groove 130. In still other exemplary embodiments, multiple protrusions 150 can be disposed in each groove 130 on the refining section 107. In still other exemplary embodiments, a majority of grooves 130 on a refiner plate segment 100 contain multiple protrusions 150.

Preferably, multiple protrusions 150 are disposed within a groove 130 such that the protrusion's first side 582 (FIG. 5) engages a leading face 121 of an adjacent refiner bar 125*z* and the protrusion's second side 581 (FIG. 5) engages a trailing face 124 of the other adjacent refiner bar 125*zz*. However, in other exemplary embodiments, protrusion sides 582, 581 need not engage the leading face 121 or trailing face 124 of the adjacent refiner bars 125*z*, 125*zz*. In still other exemplary embodiments, only one side 582 or 581 engages a refiner bar face 121 or 124. The multiple protrusions 150 are disposed at intervals 163. The intervals 463 (FIG. 4) can be regular intervals or irregular intervals. In an exemplary embodiment, protrusions 150 can be spaced every 6 mm-25 mm, and preferably every 10 mm. For comparison, subsurface dams 145 are generally further apart every 25-50 mm.

Figure 2:
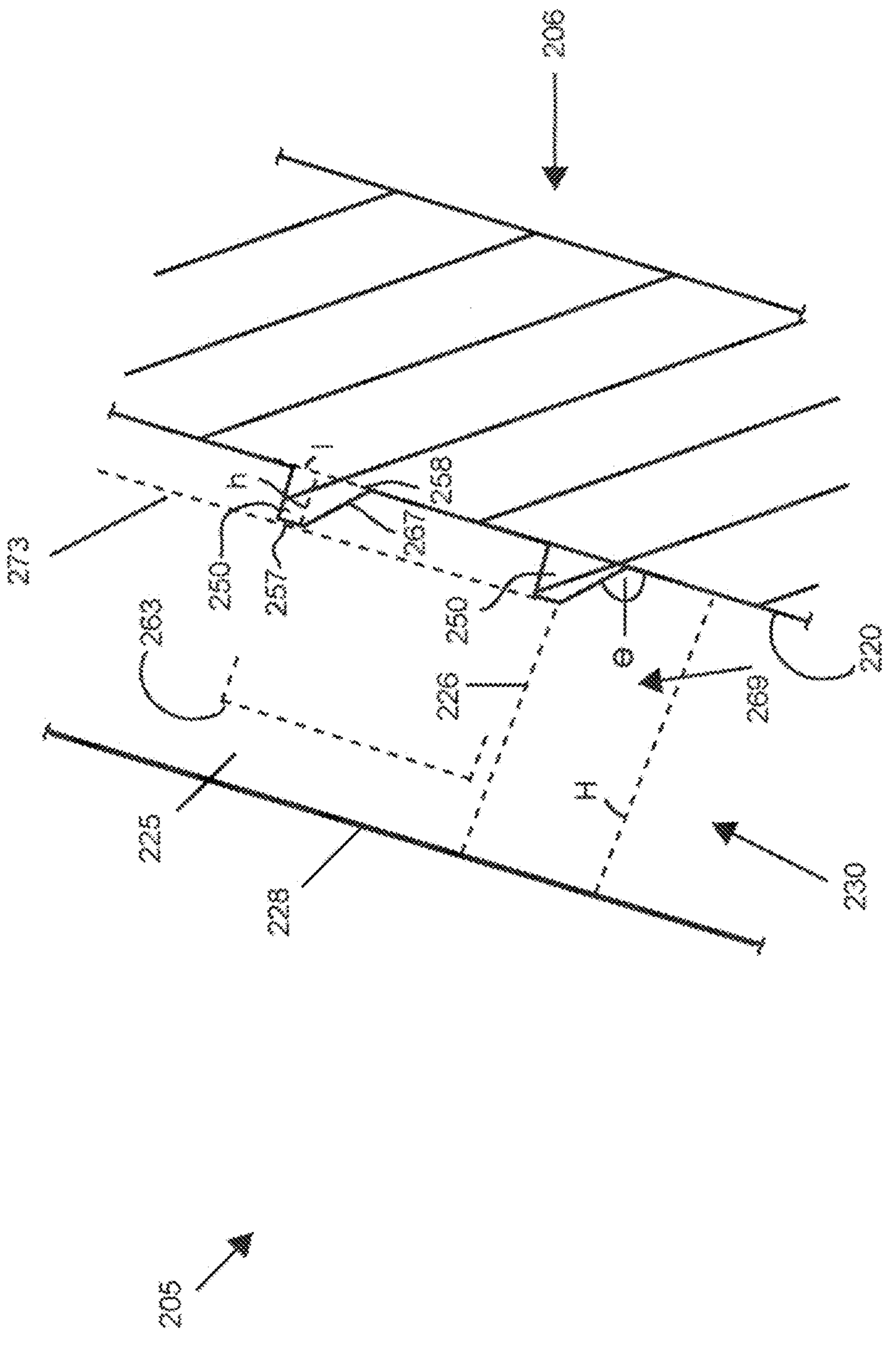
FIG. 2 is a close-up cross-sectional view of the refiner plate segment in FIG. 1 along line A-A depicting protrusions and a refiner bar.
Figure 3:
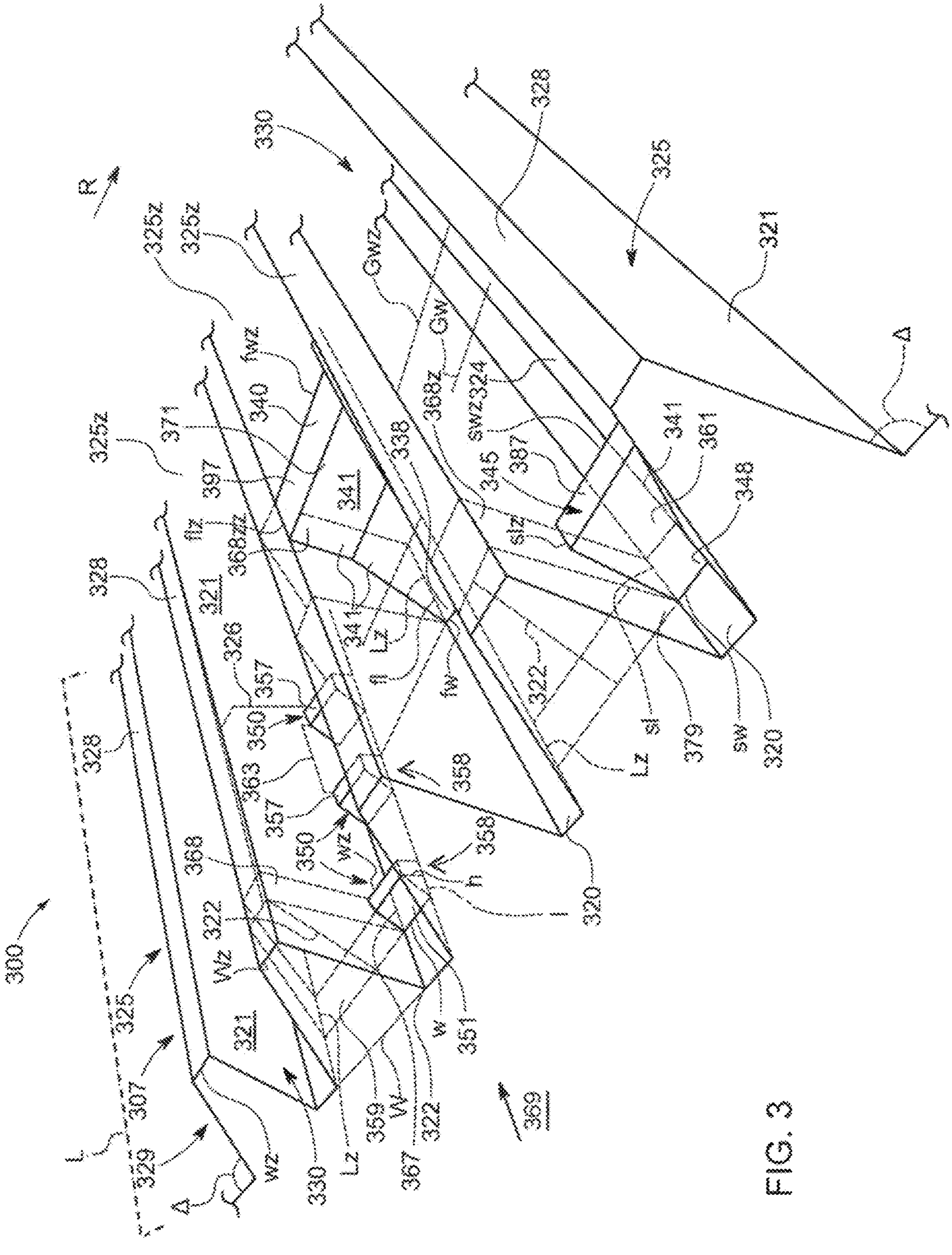
FIG. 3 is a perspective view of a portion of an exemplary refining section of a refiner plate segment having a series of protrusions disposed within a groove.

Without being bound by theory, it is believed that disposing the protrusions 150 at regular intervals within a groove 130 every 6 mm-25 mm can effectively behave the same as raising the bottom of the groove 130 to form a secondary groove bottom 273 (FIG. 2). That is, a majority of feed material 169 can flow over the tops 257 (FIG. 2) of the protrusions 150 without contacting the substrate 120. As discussed more fully with reference to FIG. 2, the raised secondary groove bottom 273 is believed to create an effective groove depth 226 that remains within a range of acceptable groove depths throughout the working life of the refiner plate segment 100. Furthermore, in instances in which wear is extreme, the effective loss of refiner bar height H (and therefore the change in effective groove depth 226) will be less than the actual loss in refiner bar height H. For example, if the bar tops wear twice as fast as the protrusion tops 257, the effective loss of bar height and therefore the change in effective groove depth 226 will only be half of the actual loss in refiner bar height H, thereby allowing the exemplary embodiments to maintain a more uniform performance, or a slower decline over the plate's life. In certain exemplary embodiments, protrusions 150 can be disposed within grooves 130 at intervals 463 every 15 mm-20 mm. In still other exemplary embodiments, the protrusions 150 can be disposed within the grooves 130 at intervals 463 every 12 mm-15 mm depending upon the feed material 169 fed through the mechanical refiner 702, 602.

In FIG. 1, the protrusions 150 generally have a shape of a rectangle or a rectangular prism, in particular, an irregular rectangular prism. The protrusions 150 extend generally orthogonally between adjacent refiner bars 125*z* and 125*zz*. In other exemplary embodiments, the protrusions 150 can be disposed at an acute angle relative to the length L (FIG. 3) of an adjacent refiner bar 325*z* (FIG. 3) or an obtuse angle relative to an adjacent refiner bar 325*z*. FIG. 1 further depicts the protrusions 150 engaging each adjacent refiner bar 125*z* and 125*zz*. In other exemplary embodiments, an exemplary protrusion 150 can engage one adjacent refiner bar 125*z* but not the opposite adjacent refiner bar 125*zz*. In still other exemplary embodiments, an exemplary protrusion 150 engages neither adjacent refiner bar 125*z* or 125*zz*.

It will be understood that the protrusions 150 can be embodied in a variety of shapes provided that the protrusions 150 be configured to wear away over time preferably at an equal or slower rate than the refiner bars 125. This wear can be due to exposure of contaminants in the feed material. A non-exhaustive list of exemplary protrusion shapes can include: a rectangle, a rectangular prism, a rectangular prism segment, a triangular prism, a triangular prism segment, a prism where the number of sides exposed to feed material is four or more or a segment thereof, a polyhedron, a polyhedral segment, a triangular pyramid, a triangular pyramid segment, a quadrilateral pyramid, a quadrilateral pyramid segment, a pyramid having five or more faces exposed to feed material or a segment thereof, a pyramidal frustum, a pyramidal frustum segment, a spherical dome, a spherical dome segment, a spheroid dome, a spheroid dome segment, a parabolic prism, a parabolic prism segment, a frustum parabolic prism, a frustum parabolic prism segment, a cone, a cone segment, a spheroid cone, a spheroid cone segment, an elliptical cone, an elliptical cone segment, a conical frustum, a capsule, a cylindrical segment, an ellipsoid conical frustum, an ellipsoid conical frustum segment, a cylinder, a cylinder segment, an elliptic cylinder, an elliptic cylinder segment, a sphere, a sphere segment, a spheroid, a spheroid segment, or combinations or permutations of any of the foregoing shapes.

In an exemplary embodiment, the protrusions 150 wear at substantially the same rate as the refiner bars 125. In other exemplary embodiments, the refiner bars 125 wear at a faster rate than the protrusions 150.

The protrusions 150 can be cast with the refiner plate segment 100. In other exemplary embodiments, the protrusions 150 can be machined from cast protrusions. In other exemplary embodiments, manufacturers can machine the protrusions 150 from the cast groove substrate (see 120). In still other embodiments, manufacturers can use additive manufacturing techniques such as welding or three-dimensional (3D) printing to add the protrusions 150 within the grooves 130. In still other exemplary embodiments, manufactures can cast an exemplary refiner plate segment by having protrusions 150 disposed in a casting mold before the manufactures pour molten metal into the casting mold. The molten casting metal can then fuse with the protrusions 150 inlaid in the casting mold. In still other exemplary manufacturing techniques, manufactures can glue the protrusions 150 to the substrate 120. In still other exemplary manufacturing embodiments, manufactures can press or hammer discrete protrusions 150 into a groove between adjacent refiner bars 125*z*, 125*zz* such that the protrusion 150 is effectively securely wedged between the adjacent refiner bars 125*z*, 125*zz*.

In still other exemplary manufacturing methods, the exemplary refiner plate segment 100 can be fabricated from metal sheets and bars. In such methods, the protrusions 150 may extend from refiner bars 125 and manufactures can glue, fuse, or otherwise fasten the refiner bars 125 to the substrate 120 to form a pattern of alternating refiner bars 125 and grooves 130. On other fabrication methods, a manufacturer can add the protrusions 150 separately to the refiner bars 125 (see FIGS. 12A-12C). In still other exemplary manufacturing methods, an exemplary refiner plate segment 100 can have protrusions 150 laser cut into the grooves 130. Other methods of affixing or creating the protrusions 150 between adjacent refiner bars 125*z*, 125*zz* are considered to be within the scope of this disclosure.

In certain exemplary embodiments, the protrusions 150 can be made of the same material as the refiner bars 125. In still other exemplary embodiments, the protrusions 150 comprise a different material than the refiner bars 125. In certain exemplary embodiments, the protrusions 150 comprise a material selected from the group consisting of: aluminum, copper, brass, steel, plastic, wood, and epoxy resin.

FIG. 2 is a cross-sectional view of refiner plate segment 100 along line A-A in FIG. 1. The refiner side 205 is oppositely disposed from the backside 206 of the refiner plate segment 100. FIGS. 1-2 depict protrusions 250 having the shape of an irregular rectangular prism. Each protrusion 250 has a protrusion leading face 267 disposed at an angle Θ relative to the substrate 220. The angle Θ between the protrusion leading face 267 and substrate 220 is preferably obtuse. The short protrusion height h (compared to the refiner bar height H) and the obtuse angle Θ of the protrusion leading face 267 direct feed material 269 remaining in the groove 230 over the top 257 of the protrusion 250. By contrast, a leading face 341 (FIG. 3) and height sh, fh of the dams 140, 145 are sufficiently high (compared to the refiner bar height H) to direct the feed material 269 out of the groove 230 and into the refining gap 619.

Without being bound by theory, Applicant believes that the distance between the top 257 of the protrusion 250 and the top 228 of an adjacent refiner bar 225 forms an effective groove depth 226. The protrusion intervals 263 are desirably sufficiently small to allow feed material 269 to flow above the protrusions 250 under normal operating conditions. In this manner, the tops 257 of the multiple protrusions 250 and the velocity at which the feed material 269 passes the tops 257 of the multiple protrusions 250 can function as a secondary groove bottom 273 disposed above the groove substrate 220.

Over time, the top 228 of the refiner bars 225 and the top 257 of the protrusions 250 wear away. The rate of wear can vary depending upon the type of refining and the type and quality of the material being refined. As the refiner bars 225 wear down, the adjacent grooves 330 (FIG. 3) become narrower GWz (FIG. 3) due to the draft angle Δ at which the refiner bar faces 321, 324 (FIG. 3) engage the substrate 320. Stated another way, the groove width GW (FIG. 3) at the top of the groove is wider than the groove width GWz below the top groove width GW. In embodiments in which the refiner bars 225 and the protrusions 250 wear at substantially the same rate, the refiner bar height H and the protrusion height h diminish over time; but, the effective groove depth 226 remains substantially constant. The substantially constant effective groove depth 226 can prolong the useful life of the refiner plate segment 100 even though the groove width GWz narrows.

It should be noted that the refiner plate segments 100 and 300 depicted in FIGS. 1 and 3 respectively represent refiner plate segments 100, 300 that have been cast from a mold. It is possible to create square grooves (i.e. grooves that have a volume of a regular rectangular prism) with fabricated plates (in which manufactures affix bars to a refiner plate segment substrate 120, 320) or from refiner plate segments cast with molds created from an additive manufacturing process (i.e. 3D printing). In exemplary embodiments wherein the grooves do not have the volume of a trapezoidal prism, the refiner bar height H and the protrusion height h still diminish over time; but, the effective groove depth 226 can change depending upon the respective wear rates of the protrusions 250 and the adjacent refiner bars 225.

In this manner, protrusions 250 disposed in a groove 230 at intervals 263, in which the protrusions 250 have a protrusion height h that is 25% or less of an adjacent bar height H, mitigates the problem of having a thicker, denser fiber pad between opposing refiner assemblies (see 603, 604) due to grooves 130 that become shallower over time. Without being bound by theory, the effective groove depth 226 functions similarly to a traditional groove of the same depth and therefore allows for the fiber pad to be maintained at a desirable thickness for longer periods. Because the difference in refiner bar height H and protrusion height h defines the effective groove depth 226, the effective groove depth 226 moves closer to the substrate 220 over time while still serving the function of a groove 230.

In embodiments in which the refiner bars 225 wear at a faster rate than the protrusions 250, the loss of effective groove depth 226 is a fraction of the loss of actual refiner bar height H thereby delaying decline in the refiner plate segment's performance.

FIG. 3 is a perspective close-up view of a portion of the refining section 307 of an exemplary refiner plate segment 300 comprising refiner bars 325 and adjacent grooves 330 disposed between the refiner bars 325. The refiner bar faces 321, 324 and the substrate 320 define the grooves 330. One or more grooves 330 contain multiple protrusions 350 disposed at intervals 363. The refiner plate segment (see 100) rotates in direction R. The leading face 321 of the refiner bars 325 tend to contact feed material 369 before the trailing faces 324. Each trailing face 324 is disposed on the opposite side of a refiner bar 325.

FIG. 3 depicts the protrusion volume 351, subsurface dam volume 361, and full-surface dam volume 371 relative to reference bar volumes 368, 368*z*, and 368*zz* respectively. Each protrusion 350 has a base 358 engaging the substrate 320. The protrusion base 358 comprises the protrusion width w multiplied by the protrusion length l. The formula for ascertaining the protrusion volume 351 varies based upon the three dimensional shape of the protrusion 350.

The reference bar volume 368 is the volume of the adjacent refiner bar 325*z*, 325*zz* that shares a length Lz with the longest length l of a protrusion 350. Likewise, the reference bar base 359 coextends with an adjacent protrusion base 358 along the longest protrusion length l. The refiner bar's width W multiplied by the coextending length Lz defines the refiner bar reference base 359. The coextending length Lz extends the same length as the protrusion length l. In the depicted embodiment, the protrusion length l at the protrusion base 358 is longer than the length at the top 357 of the protrusion 350. It will be understood that in embodiments in which length l of a protrusion 350 is non-uniform, the coextending length Lz of the reference bar volume 368 is measured from the longest length l of the protrusion 350 form the portion of the protrusion disposed closest to the inner arc 110 to the portion of the protrusion disposed closest to the outer arc 115.

The reference refiner bar volume 368 varies based upon the three dimensional shape the refiner bar 325. In the depicted embodiment, the draft angle Δ between the leading face 321 and the substrate 320 and the draft angle Δ between the trailing face 324 and the substrate 320 define the refiner bar 325 as a trapezoidal prism. Therefore, the formula, $\frac{1}{2}(W+(Wz))(Lz)H$ provides the reference bar volume 351 in the depicted embodiment. Where W is the refiner bar width at the refiner bar reference base 359, Wz is the refiner bar width at the top 328 of the refiner bar 325, Lz is the length that the reference bar 325 shares with the adjacent protrusion length l, and H is the height of the portion of the reference bar 325 adjacent to the protrusion 350. Exemplary protrusions 350 have a volume that is less than 40% of the reference bar volume 368.

In other exemplary embodiments, protrusions 350 can have a volume that is greater than 0% but less than 25% of the reference bar volume 368. It is contemplated that the ratio of the protrusion volume 351 relative to the reference bar volume 368 will remain within the disclosed range throughout the working life of the refiner plate segment 100 due the rates at which the protrusions 350 and refiner bars 325 wear. Without being bound by theory, it is believed that an exemplary protrusion 350 having a volume that is less than 40% of the reference bar volume 368 and having a height that is 30% or less of the adjacent refiner bar height H will allow the protrusion 350 to create an effective groove depth 326 that will operate within a margin of error to achieve desirable refiner performance and product quality.

FIG. 3 further depicts a subsurface dam 345 having a subsurface base 348 engaging the substrate 320. The subsurface base 348 comprises a subsurface dam length sl and a subsurface dam width sw. The subsurface dam volume 361 varies based upon the three dimensional shape of the subsurface dam 345. The reference bar's coextending length Lz extends the same amount as the longest subsurface dam length sl as measured from the portion of the subsurface dam disposed closest to the inner arc 110 and the portion of the subsurface dam disposed closest to the outer arc 115.

A full-surface dam 340 has a full-surface dam base 338 engaging the substrate 320. The full-surface dam base 338 comprises a full-surface dam length fl and a full-surface dam width fw. The full-surface dam volume 371 varies based upon the three dimensional shape of the full-surface dam 340. The reference bar's coextending length Lz extends the same amount as the longest full-surface dam length fl as measured from the portion of the full-surface dam disposed closest to the inner arc 110 and the portion of the full-surface dam disposed closest to the outer arc 115.

In contrast to the exemplary protrusions, subsurface dams 345 have a subsurface dam volume 361 that is 40% and 60% of the reference bar volume 368*z*. Similarly, the full-surface dam 340 has a full-surface dam volume 371 that is 60% to 100% of the reference bar volume 368"

Figure 4:
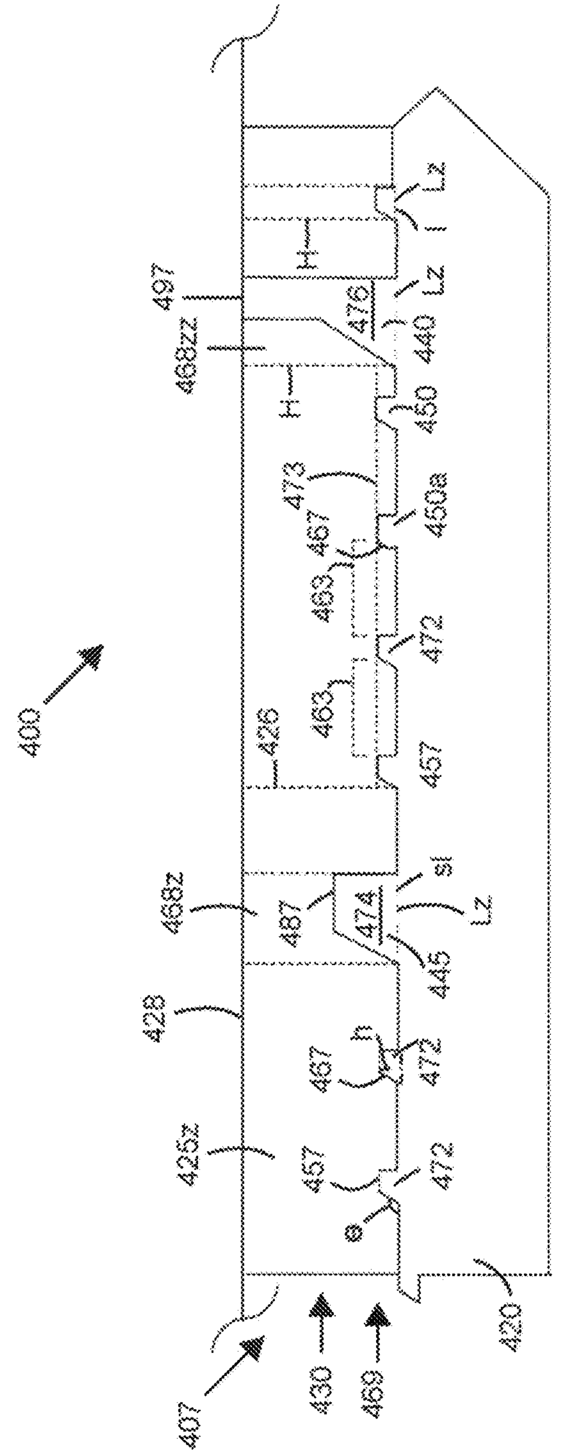
FIG. 4 is schematic representation of the longitudinal cross-sectional area of protrusions, subsurface dams, and full-surface dams compared to the longitudinal cross-sectional area of an adjacent refiner bar.

FIG. 4 is a schematic representation of the refining section 407 of an exemplary refiner plate segment 400 bisected along a length of a groove 430 to depict the longitudinal cross-sectional areas 472 of the exemplary protrusions 450. FIG. 4 shows the general path of feed material 469 flowing from a location near the inner arc 410 across the protrusions 450 toward the outer arc 415. The depicted longitudinal cross-sectional areas 472 of the protrusions 450 can be compared to the lateral cross-sectional area 546 (FIG. 5) of an adjacent reference bar 425, 525. The depicted longitudinal cross-sectional area 472 represents the thickest portion of a protrusion 450. Likewise, the depicted longitudinal cross-sectional areas 474, 476 of the dams represent the thickest portion of the subsurface dam 445 and full-surface dam 440 respectively. The formula for determining protrusion's longitudinal cross-sectional area 472, subsurface dam's longitudinal cross-sectional area 474, full-surface dam's longitudinal cross-sectional area 476 and the refiner bar's lateral cross-sectional area 546 will vary depending upon the longitudinal cross-sectional shape of protrusions 450, subsurface dams 445, full-surface dams 440, and lateral cross-sectional shape of the adjacent reference bar 425, 525 respectively.

For example, the protrusion 450*a* has a curved protrusion leading face 467 configured to direct feed material 469 over the top 457 of each protrusion 450. The cross-sectional area of protrusion 450*a* can be calculated by adding the area of the square component (i.e. the length l multiplied by the height h) to the remaining area. By way of another example, the cross-sectional area 742 of the other depicted protrusions 450 in FIG. 4 can be calculated with the formula A=1/2lh +lh, where A is the cross-sectional area 472, l is the length l of the base of the protrusion 450, and h is the height of the protrusion 450.

In the depicted embodiments, the refiner bars 425, 525 have a generally trapezoidal shape. However, it will be understood that refiner bars 425, 525 can manifest in a number of possible shapes. The lateral cross-sectional area 546 of a trapezoidal refiner bar 525 can be calculated with the formula A=½(W+Wz)H, where A is the lateral cross-sectional area 546, W is the width of the refiner bar 525 at the refiner bar's base 359, Wz is the width of the refiner bar 525 at the top 528 of the refiner bar 525, and H is the height of the refiner bar 525. The reference refiner bar 525 is adjacent to the protrusion 550.

In an exemplary embodiment, the protrusion's longitudinal cross-sectional area 472 is not more than 20% the adjacent refiner bar's lateral cross-sectional area 546. For example, a typical protrusion 450 can have a longitudinal cross-sectional area 472 of 3-4 $mm^2$ while the adjacent refiner bar 425*z* typically has a lateral cross-sectional area 546 of 30-50 $mm^2$. As comparison, a subsurface dam 445 generally has a longitudinal cross-sectional area 474 of 12-25 $mm^2$ (i.e. between 24% and 83% of the lateral cross-sectional area 546 of a typical refiner bar 425, 525) as a minimum. However, subsurface dams 445 typically have an even greater longitudinal cross-sectional area 474. Similarly, full-surface dams 440 have a longitudinal cross-sectional area 476 that is 60%-100% of the lateral cross-sectional area 546 of the adjacent refiner bar 425, 525 depending upon the shape of the full-surface dam's longitudinal cross-sectional area 476.

Figure 5:
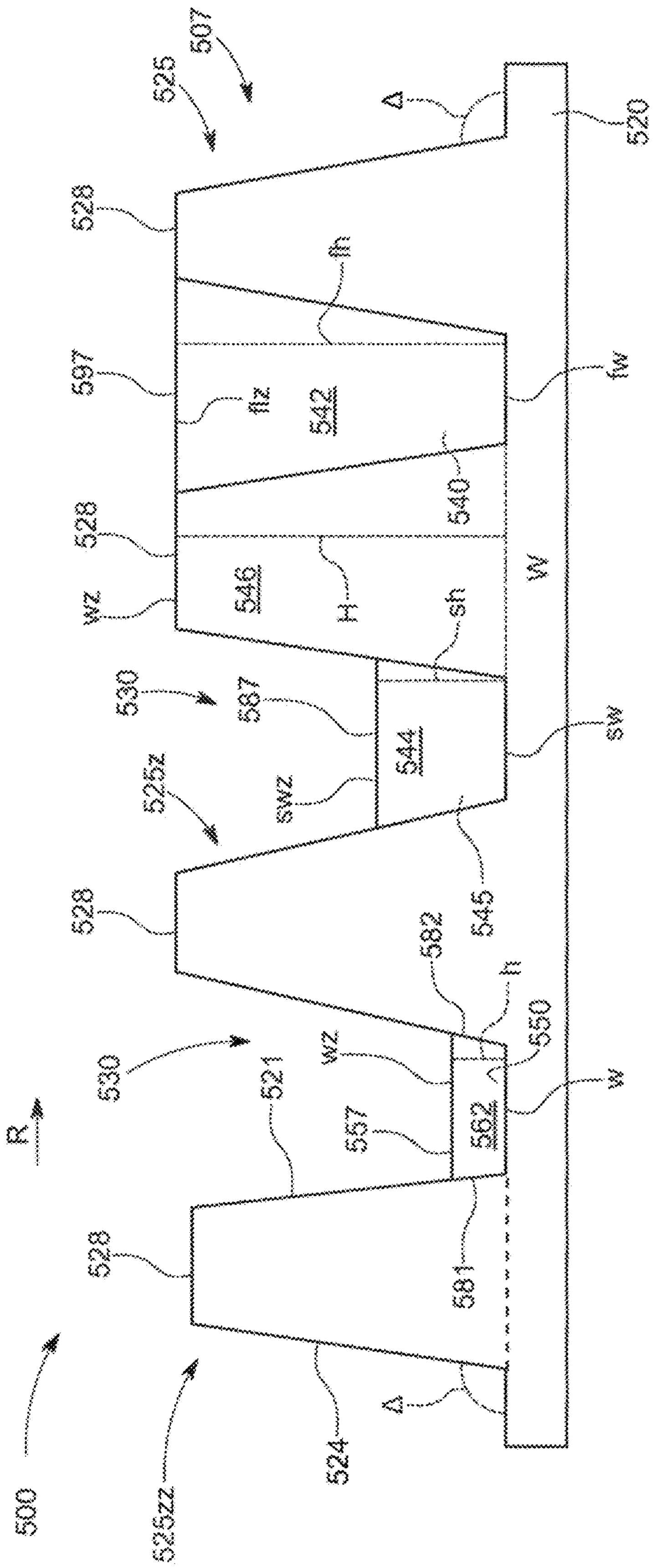
FIG. 5 is a schematic representation of the lateral cross-sectional area of exemplary protrusions compared to the lateral cross-sectional areas of subsurface dams, full-surface, dams, and refiner bars.

FIG. 5 is a schematic representing a lateral cross-section of a refining section 507 of an exemplary refiner plate segment 500 having refiner bars 525 disposed on a substrate 520 and grooves 530 disposed between adjacent refiner bars (see 525*z*, 525*zz*), wherein protrusions 550 are disposed within such grooves 530. The lateral cross-sectional area 562, 544, 542, and 546 is measured from a plane intersecting the refining section 507 transverse to the refiner bar length L. That is, the plane is orthogonal to the refiner bar length L. FIG. 5 depicts the differences in a protrusion's lateral cross-sectional area 562, subsurface dam's lateral cross-sectional area 544, and full-surface dam's cross-sectional area 542, relative to the adjacent refiner bar's lateral cross-sectional area 546 as measured along the thickest portion of the respective protrusion 550, subsurface dam 545, full-surface dams 540, and refiner bar 525.

The protrusion's lateral cross-sectional area 562, subsurface dam's lateral cross-sectional area 544, full-surface dam's lateral cross-sectional area 542 and refiner bar's lateral cross-sectional area 546 will vary based upon the shape of the protrusion 550, subsurface dam 545, full surface dam 540, and refiner bar 525 respectively. In the depicted embodiment, the lateral cross-sectional areas 562, 544, 542, and 546 are trapezoids. Accordingly, the cross-sectional area of each is given by the formula: ½(w+(wz))h. In an exemplary embodiment, the protrusion's longitudinal cross-sectional area 472 is not more than 20% the refiner bar's lateral cross-sectional area 546. For example, a typical protrusion 550 can have a longitudinal cross-sectional area 472 of 3-5 $mm^2$ while the adjacent refiner bar 525*z* typically has a lateral cross-sectional area 546 of 20-50 $mm^2$. As comparison, a subsurface dam 545 generally have a minimum lateral cross-sectional area 544 of 10 $mm^2$ (i.e. between 20% and 67% of the lateral cross-sectional area 562 of a typical refiner bar 525). However, subsurface dams 545 typically have an even greater lateral cross-sectional area 544. Similarly, full-surface dams 540 have a lateral cross-sectional area 546 that is typically equal or even greater than the lateral cross-sectional area 562 of the adjacent refiner bar 525*z*.

In other exemplary embodiments, the longitudinal cross-sectional area 472 of a protrusion 550 is not more than 15% of the lateral cross-sectional area 546 of the corresponding adjacent refiner bar 525*z*. In still other exemplary embodiments, the longitudinal cross-sectional area 472 of a protrusion 550 is not more than 15% of the lateral cross-sectional area 546 of the corresponding adjacent refiner bar 525*z*. In yet other exemplary embodiments, the lateral cross-sectional area 562 of a protrusion 550 is not more than 10% of the lateral cross-sectional area 546 of the adjacent refiner bar 525*z*. In still other exemplary embodiments, the lateral cross-sectional area 562 of a protrusion 550 is not more than 15% of the lateral cross-sectional area 546 of the adjacent refiner bar 525*z*.

Figure 8:
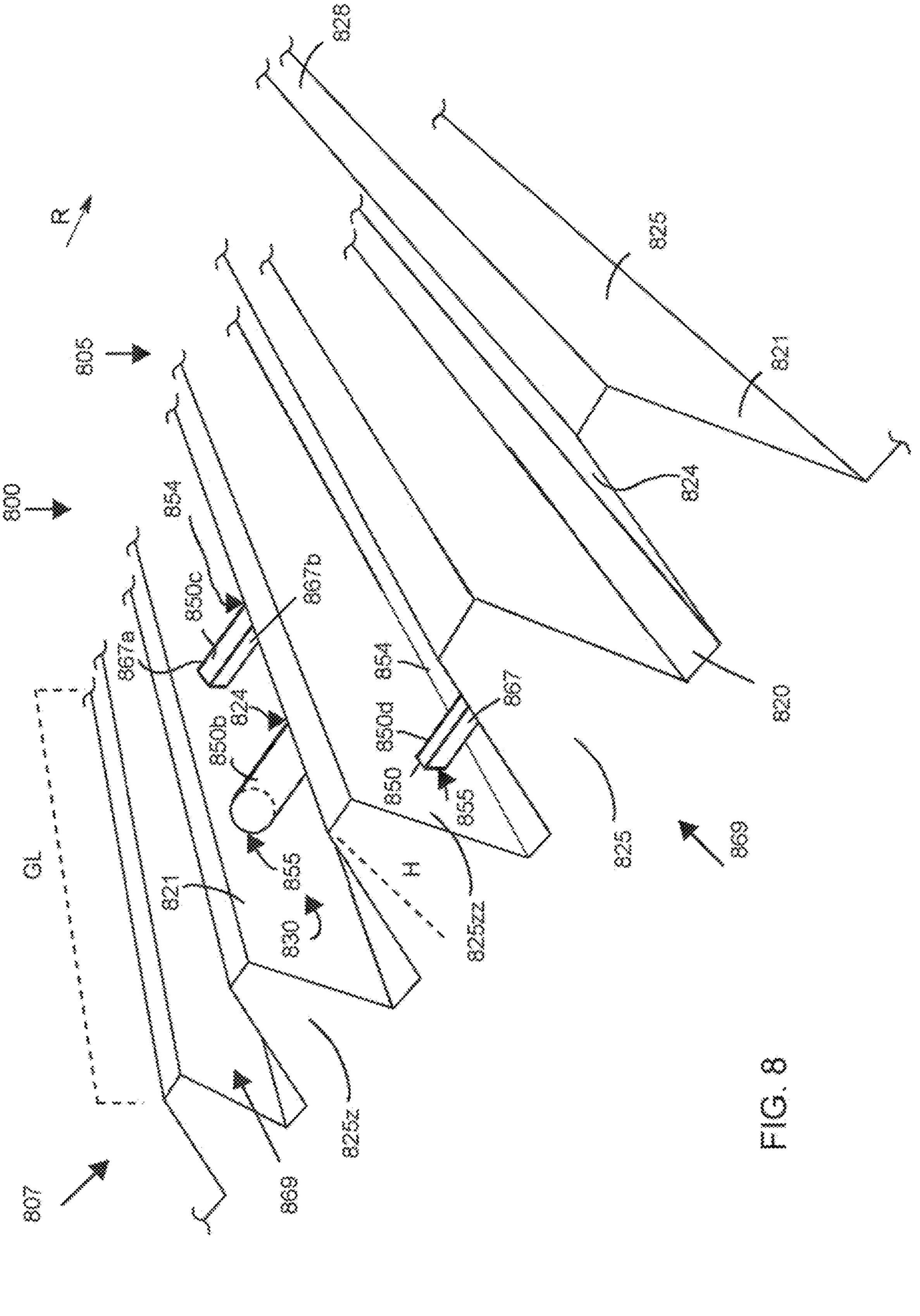
FIG. 8 is a perspective view of a schematic representation of a refining section of an exemplary refiner plate segment having protrusions, wherein the protrusions are flow restrictors.
Figure 9:
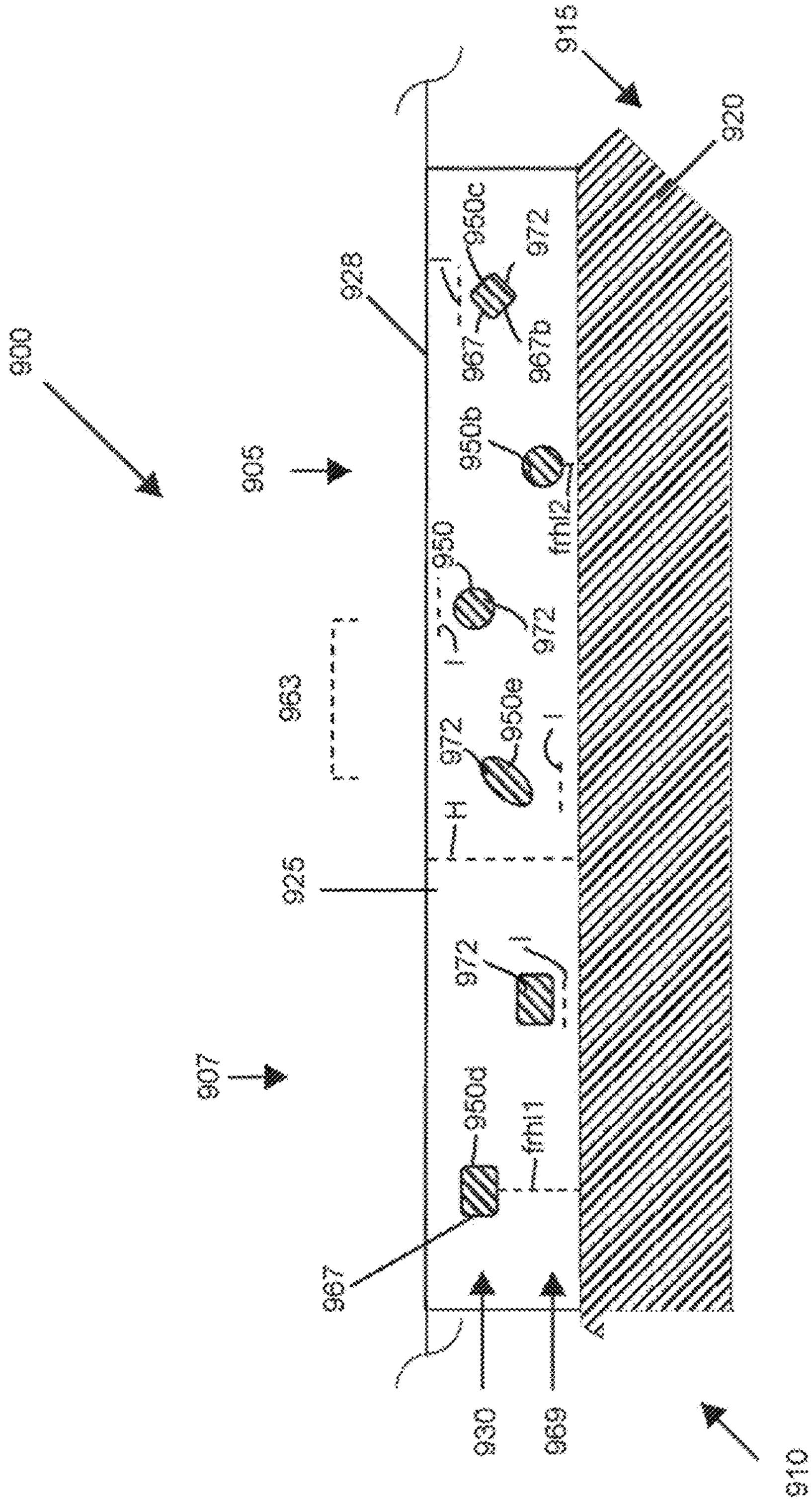
FIG. 9 is a cross-sectional schematic representation of a side view of an exemplary refiner plate segment having flow restrictors disposed along a length of a groove.
Figure 10:
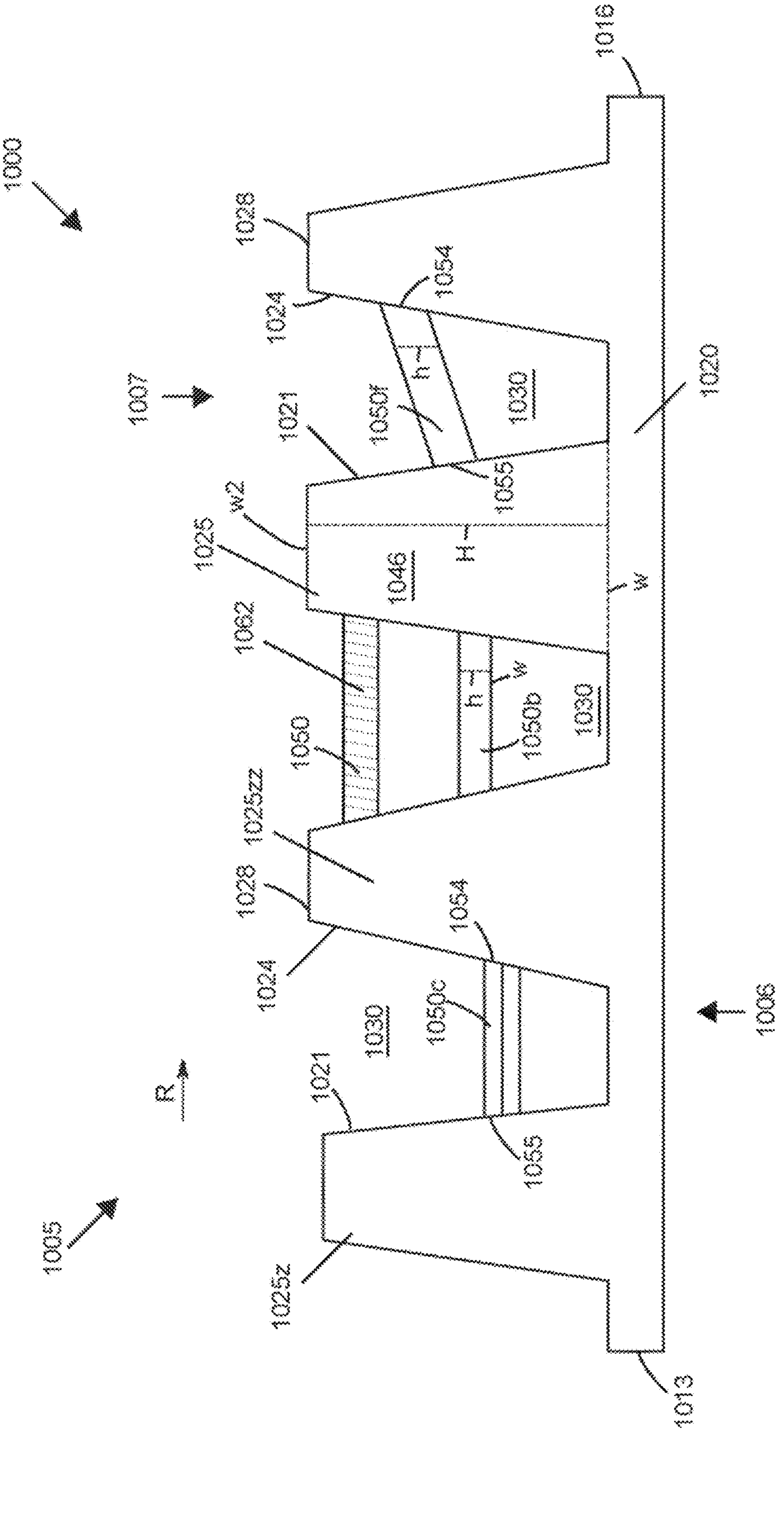
FIG. 10 is a schematic representation of a lateral cross-section of an exemplary refiner plate segment having flow restrictors.

FIGS. 8-10 depict exemplary embodiments wherein the protrusions 850, 950, 1050 are a type of protrusion 850 that can also be referred to as a "flow restrictor." Exemplary flow restrictors 850*b*, 850*c*, 850*d* can be used in any type of refiner plate segment 800; however, it is contemplated that flow restrictors 850*b*, 850*c*, 850*d* can be particularly useful in low-consistency refining.

In low-consistency refining, operators generally dilute the feed material 869 significantly before pumping the feed material 869 into the mechanical refiner (see 702). For example, low-consistency feed material 869 may be diluted in the range of 2%-6%.

A problem with conventional low-consistency refiner plate segments with excessively tall refiner bars (e.g. about 10 mm or taller) is that these tall bars created a high pumping effect and a high outlet pressure, which resulted in higher pumping energy and increased operating costs. As such, the cost (in terms of energy and capital) of running new low-consistency refiners with excessively tall refiner bars (e.g. about 10 mm or taller) exceeded the value that could be derived from feed material that had been processed through such a low-consistency refiner. These costs offset any gains in refiner plate segment operating life. When as refiner bars' height becomes too low, the refiner will not be able to handle the flow and pumping requirements, which creates a capacity limitation. As such, low-consistency refiners have a narrow range of bar heights at which efficient refining can occur. This negatively affects the useful lifetime of low-consistency refiner plate segments.

FIG. 8 is a perspective view of a schematic representation of a refining section 807 of an exemplary refiner plate segment 800. The problem of having a narrow range of effective mechanical refining, particularly in a low-consistency refiners, (see 702) is mitigated through the use of an exemplary refiner plate segment comprising: an inner arc (see 110, FIG. 1) an outer arc 115 distally disposed from the inner arc 110, a first end 113 distally disposed from a second end 116, the first end 113 and the second end 116 extending between the inner arc 110 and the outer arc 115, a substrate 820 disposed between the inner arc 110, first end 113, second end 116, and the outer arc 115, a refiner side 805 of the substrate 820 and a back side 206 of the substrate 820 distally disposed from the refiner side 805. Refiner bars 825 are engaged to the substrate 820 on the refiner side 805. The refiner bars 825 have a refiner bar height H, and adjacent refiner bars (see 825*z* and 825*zz* for example) and the substrate 820 define a groove 830 between the adjacent refiner bars 825*z*, 825*zz*. A protrusion 850*b*, 850*c*, 850*d* is disposed in the groove 830 between two adjacent refiner bars 825*z*, 825*zz*, wherein the protrusion 850*b*, 850*c*, 850*d* is a flow restrictor 850*b*, 850*c*, 850*d* having a first restrictor end 855 distally disposed from a second restrictor end 854 (see also 1054, FIG. 10). The first restrictor end 855 engages a leading face 821 of a first refiner bar 825*z* of the two adjacent refiner bars 825*z*, 825*zz*. A second restrictor end 854 engages a trailing face 824 of a second refiner bar 825*zz* of the two adjacent refiner bars 825*z*, 825*zz*, and wherein the flow restrictor 850*b*, 850*c*, 850*d* is disposed above the substrate 820 of the groove 830.

In other exemplary embodiments, only the first restrictor end 855 engages the leading face 821. In yet other exemplary embodiments, only the second restrictor end 854 engages the trailing face 824.

It will be understood that the flow restrictor 850*b*, 850*c*, 850*d* is a type of protrusion 850. As such, any description relating to a protrusion (see 150, 250, 350, 450, 550 in FIGS. 1-5 respectively) also describes potential embodiments of a flow restrictor 850*b*, 850*c*, 850*d* unless otherwise noted. For example, a flow restrictor 850*b*, 850*c*, 850*d* can take a variety of shapes.

A non-exhaustive list of exemplary flow restrictor shapes includes: a rectangle, a rectangular prism, a rectangular prism segment, a triangular prism, a triangular prism segment, a prism where the number of sides exposed to feed material is four or more or a segment thereof, a polyhedron, a polyhedral segment, a triangular pyramid, a triangular pyramid segment, a quadrilateral pyramid, a quadrilateral pyramid segment, a pyramid having five or more faces exposed to feed material or a segment thereof, a pyramidal frustum, a pyramidal frustum segment, a spherical dome, a spherical dome segment, a spheroid dome, a spheroid dome segment, a parabolic prism, a parabolic prism segment, a frustum parabolic prism, a frustum parabolic prism segment, a cone, a cone segment, a spheroid cone, a spheroid cone segment, an elliptical cone, an elliptical cone segment, a conical frustum, a capsule, a cylindrical segment, an ellipsoid conical frustum, an ellipsoid conical frustum segment, a cylinder, a cylinder segment, an elliptic cylinder, an elliptic cylinder segment, a sphere, a sphere segment, a spheroid, a spheroid segment, or combinations or permutations of any of the foregoing shapes.

Exemplary refiner plate segments 800 comprising flow restrictors 850*b*, 850*c*, 850*d* can have the flow restrictor disposed at any elevation within the groove 830 provided that the flow restrictor 850*b*, 850*c*, 850*d* does not engage the substrate 820 of the groove 830 in which the flow restrictor 850*b*, 850*c*, 850*d* is disposed. In certain exemplary embodiments, the flow restrictor 850*b*, 850*c*, 850*d* 850*b*, 850*c*, 850*d* can be disposed partially above the groove 830 (i.e. partially above the adjacent refiner bars 825*z*, 825*zz*). It is generally thought that that flow restrictor 850*b* having a generally cylindrical shape can be desirable for many refining applications because the cylindrical shape is thought to wear more uniformly over time compared to other shapes. However, a flow restrictor 850*b* with a slight budge in the middle can also be desirable.

Flow restrictor 850*c* has a generally rhomboidal shape with leading faces 867*a*, 867*b* oriented to direct feed material 869 around the flow restrictor 850*c*. Flow restrictor 850*d* has the general shape of a quadrilateral prism having a leading face 867 oriented to face oncoming feed material 869.

Without being bound by theory, it is contemplated that flow restrictors 850*b*, 850*c*, 850*d* disposed at regular or irregular intervals 963 (FIG. 9) along the length GL of the groove 830 having a height of no more than 25% of the refiner bar height H will reduce the available flow volume of the groove 830 in which the flow restrictors are disposed 850*b*, 850*c*, 850*d*. The flow restrictors 850*b*, 850*c*, 850*d* can be disposed in the grooves 830 to achieve an effective starting flow capacity. In this manner, new refiner plate segments 800 in accordance with this disclosure can have an effective starting flow capacity that is appropriate for the desired refining capacity. Over time, it is contemplated that the flow restrictors 850*b*, 850*c*, 850*d* will wear away at about the same rate as the refiner bars 825. Therefore, as the refiner bars 825 shorten due to wear, the volume of the grooves 830 decreases, but as the restrictor bars 850*b*, 850*c*, 850*d* shrink due to wear, the difference in the original size of the restrictor bars 850*b*, 850*c*, 850*d* compared to the worn size of the restrictor bars 850*b*, 850*c*, 850*d* is re-added to the groove volume. In this manner, the effective flow capacity can be maintained over the working life of the refiner plate segment 800.

Additionally, flow restrictors 850*b*, 850*c*, 850*d* disposed near the top 828 of the refiner bars 825 will wear with the refiner bars 825 as the height H of the refiner bars 825 reach the level of the flow restrictor 850*b*, 850*c*, 850*d*. This will gradually eliminate some of the uppermost flow restrictors 850*b*, 850*c*, 850*d*, thus gradually reducing restriction as bar height H decreases.

In other exemplary embodiments, the flow restrictors 850*b*, 850*c*, 850*d* can be configured to wear at a slower rate than the refiner bars 825. In such embodiments, it is contemplated that the flow capacity will reduce over time, but the refining capacity will increase.

FIG. 9 is a cross-sectional side view of an exemplary refiner plate segment 900 having flow restrictors 950*b*, 950*c*, 950*d*, 950*e*. Without being bound by theory, it is believed that disposing the protrusions 950 (i.e. flow restrictors 950*b*, 950*c*, 950*d*, 950*e* in this embodiment) at regular intervals 963 within a groove 930 every 10 mm to 50 mm. In still other exemplary embodiments, the flow restrictors 950*b*, 950*c*, 950*d*, 950*e* can be disposed within the grooves 930 at intervals 463 every 20 mm to 40 mm depending upon the feed material 969 fed through the mechanical refiner 702, 602.

As FIG. 9 illustrates, the flow restrictors 950*b*, 950*c*, 950*d*, 950*e* can be disposed at any height H within the groove 930 provided that the flow restrictor 950*b*, 950*c*, 950*d*, 950*e* does not engage the substrate 920. For example, flow restrictor 950*d* is disposed at a first flow restrictor height frh1 and flow restrictor 950*b* is disposed at a second flow restrictor height frh2. The first flow restrictor height frh1 is different from the second flow restrictor height frh2. An advantage of having flow restrictors 950*b*, 950*c*, 950*d*, 950*e* disposed in the groove 930 in the manners described is that the flow restrictors 950*b*, 950*c*, 950*d*, 950*e* also support taller refiner bars 925 and resist breakage, thereby solving another problem that plagued refiner plate segments having taller bars but no flow restrictors 950*b*, 950*c*, 950*d*, 950*e* or other types of protrusions (see 350).

FIG. 9 further illustrates that the flow restrictors 950*b*, 950*c*, 950*d*, 950*e* have a longitudinal cross-sectional area 972 measured from a plane disposed along the longest length l of the flow restrictor 950*b*, 950*c*, 950*d*, 950*e* as measured from a portion of the flow restrictor 950*b*, 950*c*, 950*d*, 950*e* disposed closest to the inner arc 910 to a portion of the flow restrictor 950*b*, 950*c*, 950*d*, 950*e* disposed closest to the outer arc 915. The first refiner bar 1025 of the two adjacent refiner bars 1025*z*, 1025*zz* has a lateral cross-sectional area 1046 measured from a plane intersecting the refining section 1007 transversely to a refiner bar length L. The flow restrictor longitudinal cross-sectional area 972 is less than 15% of the adjacent refiner bar lateral cross-sectional area 1046.

Flow restrictors 950*b*, 950*c*, 950*d*, 950*e* are shown as examples. Flow restrictor 950*b* has a generally cylindrical shape and cross-sectional area 872. Flow restrictor 950*c* has a generally rhombic shape oriented such that the leading faces 967*a* and 967*b* deflect feed material 969 around the flow restrictor 950*c*. Flow restrictor 950*d* is a quadrilateral prism having a leading face 967 oriented to face the feed material 969 directly. Flow restrictor 950*e* has the shape of an elliptic cylinder and has an oval cross-sectional area 972.

FIG. 10 is a schematic representing a lateral cross-section of a refining section 1007 of an exemplary refiner plate segment 1000 having refiner bars 1025 disposed on a substrate 1020 and grooves 1030 disposed between adjacent refiner bars (see 1025*z*, 1025*zz*), wherein protrusions 1050 are flow restrictors 1050*b*, 1050*c*, 1050*f* disposed within such grooves 1030. FIG. 10 more clearly depicts the first restrictor end 1055 engaging the leading face 1021 of a refiner bar 1025*z* and the second restrictor end 1054 engaging the trailing face 1024 of an adjacent refiner bar 1025*zz*.

Flow restrictor 1050*f* illustrates that certain exemplary flow restrictors 1050*f* can have the first flow restrictor end 1055 disposed at a different elevation than the second flow restrictor end 1054 within the groove 1030.

The protrusion's lateral cross-sectional area 1062, subsurface dam's lateral cross-sectional area (544, FIG. 5) full-surface dam's lateral cross-sectional area (542 FIG. 5) and refiner bar's lateral cross-sectional area 1046 will vary based upon the shape of the protrusion 1050, subsurface dam (545 FIG. 5), full surface dam (540, FIG. 5), and refiner bar 1025 respectively. In the depicted embodiment, the lateral cross-sectional area 1046 of the refiner bar 1025 is a trapezoid. Accordingly, the lateral cross-sectional area 1046 is given by the formula: $\frac{1}{2}(W+k(Wz))H$. The flow restrictor's lateral cross-sectional areas 1062 are rectangular in the depicted embodiment, and are given by the formula $(w-h)$. For example, a typical flow restrictor 1050*b*, 1050*c*, 1050*f* can have a lateral cross-sectional area 1062 of 3-8 $mm^2$ while the adjacent refiner bar 1025*z* typically has a lateral cross-sectional area 1046 of 20-50 $mm^2$.

In exemplary embodiments, the longitudinal cross-sectional area 972 of a protrusion 1050 is not more than 20% of the lateral cross-sectional area 1046 of the corresponding adjacent refiner bar 1025*z*. In still other exemplary embodiments, the lateral cross-sectional area 1062 of a protrusion 1050 is not more than 15% of the lateral cross-sectional area 1046 of the adjacent refiner bar 1025*z*.

Figures 11A, 11B, 11C, 11D, 11E:
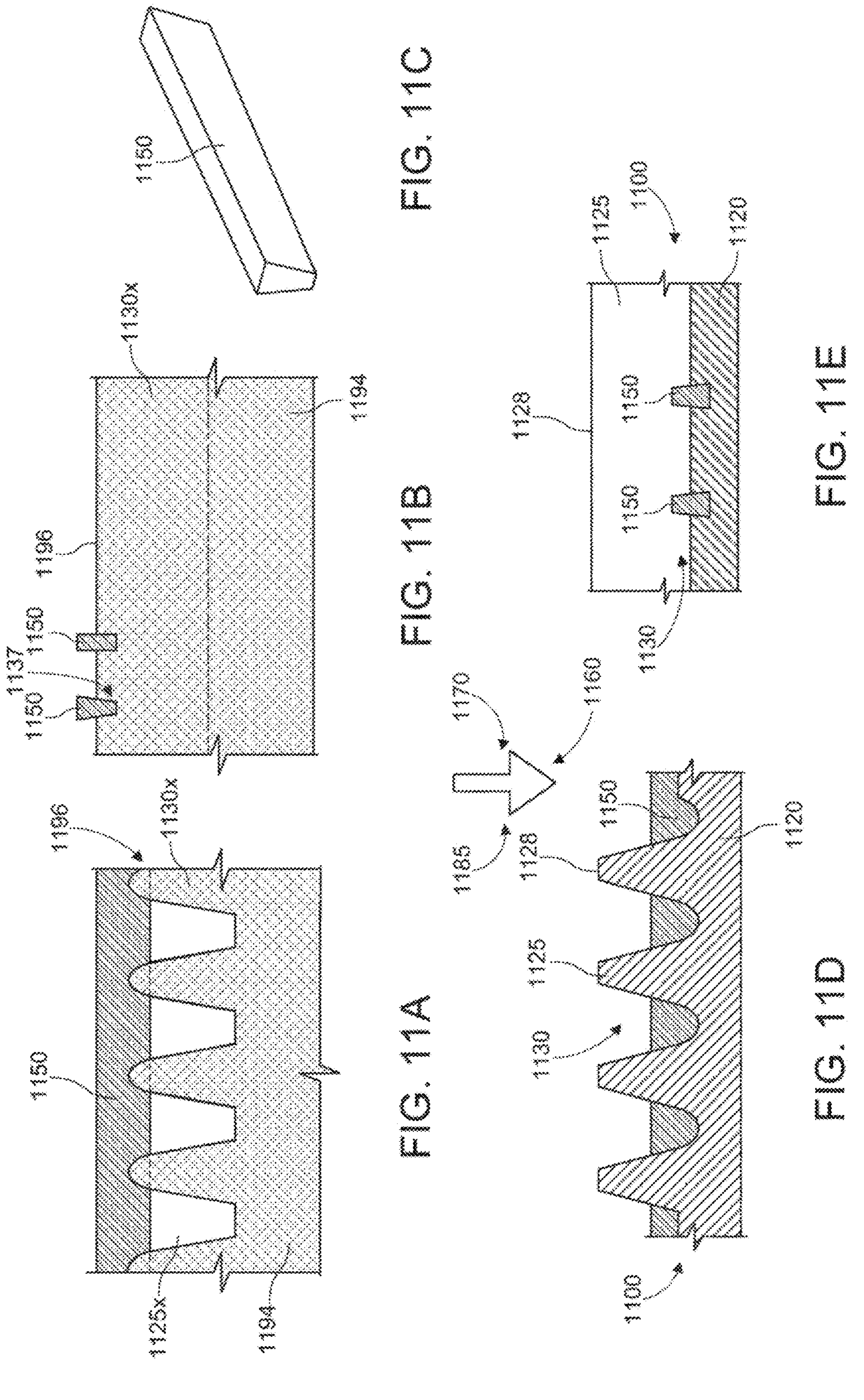
FIG. 11A is a facing view of a section of a casting mold that illustrates part of a casting technique for an exemplary refiner plate segment.
FIG. 11B is a side view of a section of a casting mold that illustrates part of a casting technique for an exemplary refiner plate segment.
FIG. 11C is a perspective view of a protrusion prior to the protrusion being inserted into the casting mold.
FIG. 11D is a facing view of an exemplary refiner plate segment having been manufactured by the exemplary manufacturing technique.
FIG. 11E is a side view of exemplary refiner plate segment having been manufactured by the exemplary manufacturing technique.

FIG. 11A is facing view of a casting mold 1194 having a series of peaks 1130*x* that will define the grooves 1130 (FIG. 11D) the refiner plate segment 1100 (FIG. 11D). The peaks 1130*x* define a plurality of notches 1137 (FIG. 11B) at the top 1196 of the peaks 1130*x*. The tops 1196 of the peaks 1130*x* will eventually define the bottom of the grooves 1130 (or at least the bottom of the grooves 1130 prior to milling (or machining) if the refiner plate segment 1100 is later subjected to a milling or machining step). The notches 1137 are desirably shaped to accommodate a protrusion 1150 made from a softer metal than the metal of the rest of the refiner plate segment 1100.

In the depicted embodiment, two or more notches 1137 are laterally aligned among adjacent peaks 1130*x*, such that a single protrusion 1150 can be supported by a line of laterally aligned notches 1137 to thereby span a plurality of adjacent peaks 1130*x*. It is contemplated that such an embodiment is the most efficient way to cast refiner plate segments 1100 in accordance with the exemplary process. In other exemplary embodiments, the notches 1137 are not laterally aligned among adjacent peaks 1130*x*. In still other exemplary embodiments, the to-be-inserted protrusions 1150 can be a lattice or other complex shape, wherein the lattice or other complex shape disposes a protrusion 1150 at different lengths along the groove length GL. In still other exemplary embodiments, the lattice or other complex shape places protrusions 1150 at different groove lengths among different grooves 1130. In this manufacturing method, the protrusion insert 1150 (FIG. 11C) is desirably shaped to be flush with the shape of the notch 1130*x* when inserted into the casting mold 1194. A protrusion 1150 disposed in a notch 1130*x* is an "inlaid protrusion." In an exemplary embodiment, the protrusion 1150 (FIG. 11C) can be made of a softer metal (e.g. aluminum) compared to the alloy of the rest of the refiner plate segment 1100 (e.g. typically an alloy of steel). When the casting mold 1194 is closed, the protrusions 1150 can be kept in place by gravity. In other exemplary embodiments, the inlaid protrusions 1150 are held in place by clamping the two halves of the casting mold 1194. In other exemplary embodiments, the inlaid protrusions 1150 can be kept in place by glue, binder, or by frictional forces.

When the molten metal or alloy that will become the refiner plate segment 1100 is poured into the casting mold 1194, the molten metal or alloy fuses with the inlaid protrusions 1150, thereby creating a durable bond. Manufactures thereby pour molten metal or alloy into the casting mold 1194 (represented by step 1185), allow the molten metal to cool and solidify (represented by step 1170) and extract the refiner plate segment 1150 from the casting mold 1194 (represented by step 1160). This is usually done by breaking the casting mold 1194.

FIG. 11D is a facing view of an exemplary refiner plate segment 1100 created with the exemplary manufacturing method. The tops 1128 of the refiner bars 1125 were created in the bottoms of the spaces 1125*x* defined between adjacent peaks 1130*x* of the casting mold 1194. In the depicted exemplary embodiment, the protrusions 1150 span through and between adjacent refiner bars 1125. FIG. 11E is a side view of the section of the exemplary refiner plate segment 1100 depicted in FIG. 11D. With this exemplary manufacturing process, the protrusions 1150 become embedded in the substrate 1120 of the refiner plate segment 1100.

Figure 12C:
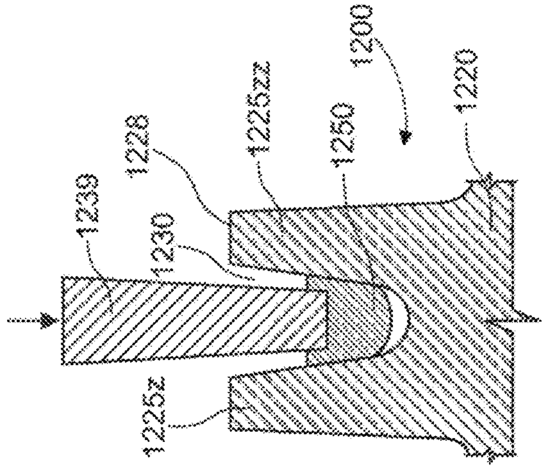
FIG. 12C is a facing view showing the installation of a wedge shaped protrusion with a protrusion setter.
Figure 12B:
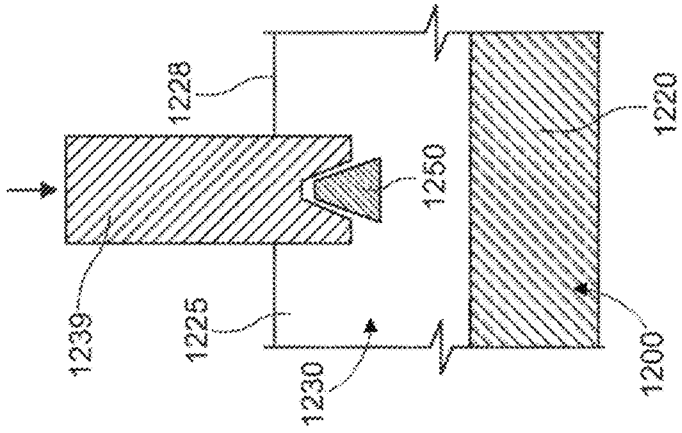
FIG. 12B is a side view showing the installation of a wedge shaped protrusion with a protrusion setter.
Figure 12A:
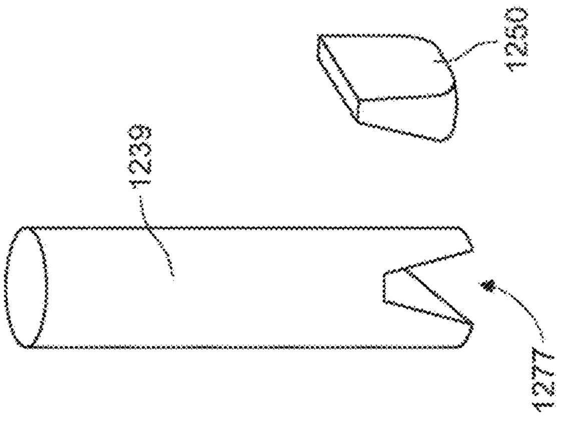
FIG. 12A is a perspective representation of a protrusion setter and a wedge shaped protrusion.

FIGS. 12A, 12B, and 12C depict a fabrication method in which the protrusions 1250 are wedged between adjacent refiner bars 1225*z*, 1225*zz* (FIG. 12C). The protrusions can be wedged between adjacent refiner bars 1225*z*, 1225*zz* of a finished or nearly finished refiner plate segment 1200. This can be done by press-fitting the protrusions 1250 with hydraulic press, hammer, or any other known method.

FIG. 12A depicts a protrusion setter 1239 having a slot 1277. The slot 1277 is desirably contoured to envelop the top of a protrusion 1250. The protrusion setter 1239 and protrusion 1250 are positioned in the groove 1230 above the desired installation location. The hydraulic press, hammer, or other device configured to apply a downward force then transfers the downward force through the protrusion setter 1239 into the protrusion 1250 to wedge the protrusion 1250 downward and between two adjacent refiner bars 1225*z*, 1225*zz*. FIG. 12B is a side view showing the installation of a protrusion 1250 in accordance with this exemplary method. FIG. 12C is a facing view of the same.

An exemplary method comprises: arranging protrusions in the positive grooves of a casting mold to define inlaid protrusions, the protrusions having a protrusion height, wherein the protrusion height is no more than 25% of a negative refiner bar height in the casting mold, pouring molten metal into the casting mold, fusing the inlaid protrusions with the molten metal, permitting the molten metal to cool to define a cast refiner plate segment, removing the cast refiner plate segment from the mold. An exemplary method can further comprise: machining cast refining bars and cast refining protrusions on a refiner side of the cast refiner plate segment.

Another exemplary method comprises: pouring molten metal into the casting mold, permitting the molten metal to cool to define a cast refiner plate segment, removing the cast refiner plate segment from the mold, and machining a groove substrate to define protrusions, wherein the protrusions have a protrusion height, wherein the protrusion height is no more than 25% of a refiner bar height adjacent to the protrusions.

An exemplary a refiner plate segment comprises: an inner arc, an outer arc distally disposed from the inner arc, a first end distally disposed from a second end, the first end and second end extending between the inner arc and the outer arc, a substrate disposed between the inner arc, first end, second end, and the outer arc, a refiner side and a back side distally disposed from the refiner side, refiner bars engaged to the substrate on the refiner side, wherein the refiner bars have a refiner bar height, and wherein adjacent refiner bars and the substrate define a groove between the adjacent refiner bars, and a protrusion disposed in the groove, the protrusions having a protrusion height, wherein the protrusion height is no more than 30% of the refiner bar height.

An exemplary refiner plate segment can further comprise multiple protrusions, wherein the protrusions are disposed at regular intervals of between 6 millimeters to 25 millimeters within the groove. An exemplary refiner plate segment can further comprise multiple protrusions, wherein the protrusions are disposed at irregular intervals.

An exemplary refiner plate segment can further have a shape of a rectangle, a rectangular prism, wherein the protrusion has a leading face disposed at an angle relative to the substrate on the refiner side of the refiner plate segment, and wherein the angle is an obtuse angle.

In an exemplary embodiment, the protrusion comprises a material selected from the group consisting of: aluminum, copper, brass, steel, plastic, wood, and epoxy resin.

In an exemplary embodiment, the refiner bars have an initial bar height of 12 mm-15 mm and the protrusion has an initial protrusion height of 2 mm-3 mm. In yet another an exemplary embodiment, the refiner bars have an initial bar height of 10 mm-20 mm and the protrusion has an initial protrusion height of 2 mm-5 mm. In still other exemplary embodiment, the refiner bars have an initial bar height of 12 mm-15 mm and the protrusion has an initial protrusion height of 2 mm-3.5 mm. In an exemplary embodiment, a protrusion length is no more than 10% of a refiner bar length.

An exemplary refiner plate segment comprises: an inner arc, an outer arc distally disposed from the inner arc, a first end distally disposed from a second end, the first end and the second end extending between the inner arc and the outer arc, a substrate disposed between the inner arc, first end, second end, and the outer arc, a refiner side of the substrate and a back side of the substrate distally disposed from the refiner side, refiner bars engaged to the substrate on the refiner side, wherein the refiner bars have a refiner bar height, and wherein adjacent refiner bars and the substrate define a groove between the adjacent refiner bars, and protrusions disposed in the groove, the protrusions having a protrusion top, a protrusion base, and a protrusion height between the protrusion top and the protrusion base, and a side connecting the protrusion top and the protrusion base, wherein a protrusion of the protrusions has a longitudinal cross-sectional area measured from a plane disposed along the longest length of the protrusion as measured from a portion of the protrusion disposed closest to the inner arc to a portion of the protrusion disposed closest to the outer arc, wherein an adjacent refiner bar of the refiner bars has a lateral cross-sectional area measured from a plane intersecting the refining section transversely to a refiner bar length, and wherein protrusion longitudinal cross-sectional area is less than 20% of the adjacent refiner bar lateral cross-sectional area.

In an exemplary embodiment, the refiner plate segment further comprises a difference between the protrusion height and the refiner bar height, wherein the difference between the protrusion height and the refiner bar height is an effective groove depth.

In an exemplary embodiment, the refiner plate segment further comprises dams, wherein the dams have a dam longitudinal cross-sectional area and wherein the dam longitudinal cross-sectional area is greater than 20% of a reference bar longitudinal area, wherein the reference bar longitudinal area comprises a length and a height, wherein the reference bar length coextends with a longest length of the dam.

In an exemplary embodiment, the protrusions are disposed at irregular intervals.

In an exemplary embodiment, a protrusion of the protrusions has a shape of a trapezoidal prism, wherein the protrusion has a leading face disposed at an angle relative to the substrate on the refiner side of the refiner plate segment, and wherein the angle is an obtuse angle.

An exemplary refiner plate segment comprises: an inner arc, an outer arc distally disposed from the inner arc, a first end distally disposed from a second end, the first end and the second end extending between the inner arc and the outer arc, a substrate disposed between the inner arc, first end, second end, and the outer arc, a refiner side of the substrate and a back side of the substrate distally disposed from the refiner side, refiner bars engaged to the substrate on the refiner side, wherein the refiner bars have a refiner bar height, and wherein adjacent refiner bars and the substrate define a groove between the adjacent refiner bars, and a protrusion disposed in the groove between two adjacent refiner bars, wherein the protrusion is a flow restrictor having a first restrictor end distally disposed from a second restrictor end, wherein the first restrictor end engages a leading face of a first refiner bar of the two adjacent refiner bars, and wherein the flow restrictor is disposed above the substrate of the groove.

In an exemplary embodiment, the flow restrictor has a longitudinal cross-sectional area measured from a plane disposed along the longest length of the flow restrictor as measured from a portion of the flow restrictor disposed closest to the inner arc to a portion of the flow restrictor disposed closest to the outer arc, wherein the first refiner bar of the two adjacent refiner bars has a lateral cross-sectional area measured from a plane intersecting the refining section transversely to a refiner bar length, and wherein flow restrictor longitudinal cross-sectional area is less than 20% of the adjacent refiner bar lateral cross-sectional area.

In an exemplary embodiment, a second restrictor end engages a trailing face of a second refiner bar of the two adjacent refiner bars.

An exemplary embodiment further comprises multiple protrusions, wherein the multiple protrusions are flow restrictors.

In an exemplary embodiment, a first flow restrictor of the multiple flow restrictors is disposed at a first flow restrictor height, and wherein a second flow restrictor of the multiple flow restrictors is disposed at a second flow restrictor height.

In an exemplary embodiment, the first flow restrictor end is disposed at a different elevation than the second flow restrictor end.

While this invention has been particularly shown and described with references to exemplary embodiments thereof, it will be understood by those skilled in the art that various changes in form and details may be made therein without departing from the scope of the invention encompassed by the appended claims.

What is claimed is:

1. A refiner plate segment comprising:

an inner arc;

an outer arc distally disposed from the inner arc;

a first end distally disposed from a second end, the first end and second end extending between the inner arc and the outer arc;

a substrate disposed between the inner arc, first end, second end, and the outer arc;

a refiner side and a backside distally disposed from the refiner side;

refiner bars engaged to the substrate on the refiner side, wherein the refiner bars have a refiner bar height, and wherein a first pair of adjacent refiner bars and the substrate define a first groove between the adjacent refiner bars and additional pairs of adjacent refiner bars and the substrate define a plurality of second grooves;

a plurality of protrusions disposed in the first groove, the protrusions each having a protrusion height, wherein a protrusion height is no more than 30% of the refiner bar height; and a plurality of dams disposed in each of the second grooves, wherein the dams include surface dams and subsurface dams, wherein a spacing between adjacent protrusions in the first groove is less than a spacing between adjacent subsurface dams in the second grooves that include subsurface dams, and wherein the plurality of protrusions are configured to wear at a rate substantially equal to a rate of wear of the refiner bars so as to maintain an effectively constant groove depth.

2. The refiner plate segment of claim 1, wherein at least one of the protrusion has a shape and the shape is selected from the group consisting of: a rectangle, a rectangular prism, a rectangular prism segment, a triangular prism, a triangular prism segment, a prism where a number of sides exposed to feed material is four or more or a segment thereof, a polyhedron, a polyhedral segment, a triangular pyramid, a triangular pyramid segment, a quadrilateral pyramid, a quadrilateral pyramid segment, a pyramid having five or more faces exposed to feed material or a segment thereof, a pyramidal frustum, a pyramidal frustum segment, a spherical dome, a spherical dome segment, a spheroid dome, a spheroid dome segment, a parabolic prism, a parabolic prism segment, a frustum parabolic prism, a frustum parabolic prism segment, a cone, a cone segment, a spheroid cone, a spheroid cone segment, an elliptical cone, an elliptical cone segment, a conical frustum, a capsule, a cylindrical segment, an ellipsoid conical frustum, an ellipsoid conical frustum segment, a cylinder, a cylinder segment, an elliptic cylinder, an elliptic cylinder segment, a sphere, a sphere segment, a spheroid, a spheroid segment, —or combinations thereof.

3. The refiner plate segment of claim 1 further comprising multiple protrusions, wherein the protrusions are disposed at regular intervals of between 6 millimeters to 25 millimeters within the groove.

4. The refiner plate segment of claim 1, wherein the protrusions are disposed at irregular intervals.

5. The refiner plate segment of claim 1, wherein at least one of the protrusion has a shape of a rectangular prism, wherein the protrusion has a leading face disposed at an angle relative to the substrate on the refiner side of the refiner plate segment, and wherein the angle is an obtuse angle.

6. The refiner plate segment of claim 1, wherein the protrusions comprise a material selected from the group consisting of: aluminum, copper, brass, steel, plastic, wood, and epoxy resin.

7. The refiner plate segment of claim 1, wherein the refiner bars have an initial bar height of 10 mm-20 mm and the protrusion has an initial protrusion height of 2 mm-5 mm.

8. The refiner plate segment of claim 1, wherein each refiner bar further comprises a reference bar volume comprising a volume of a portion of the refiner bar sharing a length with a longest length of a protrusion and a reference bar base coextending with an adjacent protrusion base along the longest protrusion length, wherein the protrusion further comprises a protrusion volume, and wherein the protrusion volume is less than 40% of the reference bar volume.

9. The refiner plate segment of claim 1, wherein the refiner bars have an initial bar height of 12 mm-15 mm and the protrusion has an initial protrusion height of 2 mm-3.5 mm.

10. A refiner plate segment comprising:

an inner arc;

an outer arc distally disposed from the inner arc;

a first end distally disposed from a second end, the first end and the second end extending between the inner arc and the outer arc;

a substrate disposed between the inner arc, first end, second end, and the outer arc;

a refiner side of the substrate and a back side of the substrate distally disposed from the refiner side;

refiner bars engaged to the substrate on the refiner side, wherein the refiner bars have a refiner bar height, and wherein a first pair of adjacent refiner bars and the substrate define a first groove between the adjacent refiner bars and additional pairs of adjacent refiner bars and the substrate define a plurality of second grooves;

protrusions disposed in the first groove, the protrusions each having a protrusion top, a protrusion base, and a protrusion height between the protrusion top and the protrusion base, and a side connecting the protrusion top and the protrusion base, wherein each protrusion of the protrusions has a longitudinal cross-sectional area measured from a plane disposed along a longest length of the protrusion as measured from a portion of the protrusion disposed closest to the inner arc to a portion of the protrusion disposed closest to the outer arc, wherein an adjacent refiner bar of the refiner bars has a lateral cross-sectional area measured from a plane intersecting a refining section transversely to a refiner bar length, wherein the protrusion longitudinal cross-sectional area is less than 20% of a lateral cross-sectional area of the adjacent refiner bar, and a plurality of dams disposed in each of the second grooves, wherein the dams include surface dams and subsurface dams, wherein a spacing between adjacent protrusions in the first groove is less than a spacing between adjacent subsurface dams in the second grooves that include subsurface dams, and wherein the protrusions are configured to wear at a rate substantially equal to a rate of wear of the refiner bars so as to maintain an effectively constant groove depth.

11. The refiner plate segment of claim 10 further comprising a difference between the protrusion height and the refiner bar height, wherein the difference between the protrusion height and the refiner bar height is an effective groove depth.

12. The refiner plate segment of claim 10 further comprising dams, wherein the dams have a dam longitudinal cross-sectional area and wherein the dam longitudinal cross-sectional area is greater than 20% of a reference bar longitudinal area, wherein the reference bar longitudinal area comprises a length and a height, wherein the reference bar length coextends with a longest length of the dam.

13. The refiner plate segment of claim 10, wherein the protrusions have a shape and the shape is selected from the group consisting of a rectangular prism, a rectangular prism segment, a triangular prism, a triangular prism segment, a prism where a number of sides exposed to feed material is four or more or a segment thereof, a polyhedron, a polyhedral segment, a triangular pyramid, a triangular pyramid segment, a quadrilateral pyramid, a quadrilateral pyramid segment, a pyramid having five or more faces exposed to feed material or a segment thereof, a pyramidal frustum, a pyramidal frustum segment, a spherical dome, a spherical dome segment, a spheroid dome, a spheroid dome segment, a parabolic prism, a parabolic prism segment, a frustum parabolic prism, a frustum parabolic prism segment, a cone, a cone segment, a spheroid cone, a spheroid cone segment, an elliptical cone, an elliptical cone segment, a conical frustum, a capsule, a cylindrical segment, an ellipsoid conical frustum, an ellipsoid conical frustum segment, a cylinder, a cylinder segment, an elliptic cylinder, an elliptic cylinder segment, a sphere, a sphere segment, a spheroid, a spheroid segment, or combinations thereof.

14. The refiner plate segment of claim 10, wherein the protrusions are disposed at regular intervals of between 6 millimeters to 25 millimeters within the first groove.

15. The refiner plate segment of claim 10, wherein the protrusions are disposed at irregular intervals.

16. The refiner plate segment of claim 10, wherein a protrusion of the protrusions has a shape of a trapezoidal prism, wherein the protrusion has a leading face disposed at an angle relative to the substrate on the refiner side of the refiner plate segment, and wherein the angle is an obtuse angle.

17. A refiner plate segment comprising:

an inner arc;

an outer arc distally disposed from the inner arc;

a first end distally disposed from a second end, the first end and the second end extending between the inner arc and the outer arc;

a substrate disposed between the inner arc, first end, second end, and the outer arc; a refiner side of the substrate and a backside of the substrate distally disposed from the refiner side;

refiner bars engaged to the substrate on the refiner side, wherein the refiner bars have a refiner bar height, and wherein a first pair of adjacent refiner bars and the substrate define a first groove between the adjacent refiner bars and additional pairs of adjacent refiner bars and the substrate define a plurality of second grooves;

a plurality of protrusions disposed in the first groove between the first pair of adjacent refiner bars, wherein each of the protrusions is a flow restrictor having a first restrictor end distally disposed from a second restrictor end, wherein the first restrictor end engages a leading face of a first refiner bar of the first pair of adjacent refiner bars, and wherein the flow restrictor is disposed above the substrate of the first groove; and a plurality of dams disposed in each of the second grooves, wherein the dams include surface dams and subsurface dams, wherein a spacing between adjacent protrusions in the first groove is less than a spacing between adjacent subsurface dams in the second grooves that include subsurface dams, and wherein the plurality of protrusions are configured to wear at a rate substantially equal to a rate of wear of the refiner bars so as to maintain an effectively constant groove depth.

18. The refiner plate segment of claim 17, wherein the flow restrictor has a longitudinal cross-sectional area measured from a plane disposed along a longest length of the flow restrictor as measured from a portion of the flow restrictor disposed closest to the inner arc to a portion of the flow restrictor disposed closest to the outer arc, wherein the first refiner bar of the pair of adjacent refiner bars has a lateral cross-sectional area measured from a plane intersecting a refining section transversely to a refiner bar length, and wherein flow restrictor longitudinal cross-sectional area is less than 20% of a lateral cross-sectional area of an adjacent refiner bar.

19. The refiner plate segment of claim 17, wherein a second restrictor end engages a trailing face of a second refiner bar of the first pair of adjacent refiner bars.

20. The refiner plate segment of claim 17, wherein a first flow restrictor of the flow restrictors is disposed at a first flow restrictor height, and wherein a second flow restrictor of the flow restrictors is disposed at a second flow restrictor height.

21. The refiner plate segment of claim 17, wherein the first restrictor end is disposed at a different elevation than the second restrictor end.

22. A method comprising:

arranging protrusions in positive grooves of a casting mold to define inlaid protrusions, the protrusions having a protrusion height, wherein the protrusion height is no more than 25% of a negative refiner bar height in the casting mold;

pouring molten metal into the casting mold;

fusing the inlaid protrusions with the molten metal;

permitting the molten metal to cool to define a cast refiner plate segment; and removing the cast refiner plate segment from the casting mold, wherein the cast refiner plate segment comprises the refiner plate segment of claim 1.

23. The method of claim 22 further comprising: machining cast refining bars and cast refining protrusions on a refiner side of the cast refiner plate segment.

* * * * *